(12) United States Patent
Toyota et al.

(10) Patent No.: US 7,823,950 B2
(45) Date of Patent: Nov. 2, 2010

(54) SEAT DEVICE FOR VEHICLE

(75) Inventors: Minoru Toyota, Hiroshima (JP); Akira Ito, Hiroshima (JP); Kazue Sumida, Hiroshima (JP)

(73) Assignee: Mazda Motor Corporation (JP)

( * ) Notice: Subject to any disclaimer, the term of this patent is extended or adjusted under 35 U.S.C. 154(b) by 1016 days.

(21) Appl. No.: 11/055,121

(22) Filed: Feb. 11, 2005

(65) Prior Publication Data

US 2005/0218683 A1    Oct. 6, 2005

(30) Foreign Application Priority Data

Mar. 31, 2004 (JP) .............................. 2004-104268
Apr. 19, 2004 (JP) .............................. 2004-122713

(51) Int. Cl.
*B60N 2/32* (2006.01)

(52) U.S. Cl. .............. 296/65.01; 296/65.13; 296/65.11; 296/65.16; 297/233; 297/248; 297/257; 297/230.1; 297/250.1

(58) Field of Classification Search .............. 296/63, 296/65.01, 65.05, 65.08, 65.09, 65.13, 65.11, 296/65.12, 64, 65.16; 297/232, 233, 234, 297/248, 257, 230.14, 230.1, 250.1
See application file for complete search history.

(56) References Cited

U.S. PATENT DOCUMENTS

| | | | | |
|---|---|---|---|---|
| 2,621,708 A | * | 12/1952 | Luce, Jr. | ...................... 297/117 |
| 4,496,189 A | * | 1/1985 | Tanizaki et al. | ................ 297/63 |
| 7,341,302 B2 | * | 3/2008 | Slade | ....................... 296/65.01 |
| 7,490,896 B2 | * | 2/2009 | Smith | .......................... 297/235 |

FOREIGN PATENT DOCUMENTS

| | | |
|---|---|---|
| DE | 200 00 479 | 7/2001 |
| DE | 200 17 051 | 3/2002 |
| EP | 0 943 482 | 9/1999 |
| JP | 63-179248 | 11/1988 |
| JP | 6426551 U | 2/1989 |
| JP | H01-021056 Y2 | 6/1989 |
| JP | H02-061734 U | 5/1990 |

(Continued)

OTHER PUBLICATIONS

Japanese Office Action "Reasons for Rejection" dated Apr. 21, 2009; for application No. 2004-104268.

(Continued)

*Primary Examiner*—Joseph D Pape
(74) *Attorney, Agent, or Firm*—Studebaker & Brackett PC; Donald R. Studebaker

(57) ABSTRACT

There is provided a seat device for a vehicle comprising a pair of main seats disposed in the vehicle width direction including respectively a main seat cushion and main seat back, and a sub seat back disposed between the main seat backs, wherein the sub seat back is configured so as to be in an arranged position in which the sub seat back is located above the main seat cushion and before the main seat back, and the main seat backs are configured so as to be moved inward when the sub seat back is in the arranged position. Accordingly, the width of the seat can be adjusted variably, without improperly affecting spaces behind or before the seat, thereby attaining both the movement of seat and the improvement of space utility.

14 Claims, 27 Drawing Sheets

FOREIGN PATENT DOCUMENTS

| | | |
|---|---|---|
| JP | H02-061737 U | 5/1990 |
| JP | 0435929 U | 3/1992 |
| JP | 07-108864 | 4/1995 |
| JP | 2000-264109 | 9/2000 |
| WO | WO 03/095263 | 11/2003 |

OTHER PUBLICATIONS

Japanese Office Action "Notice of Reasons for Refusal" dated Jul. 21, 2009, Application No. 2004-104268.

European Search Report.

* cited by examiner

SEAT DEVICE FOR VEHICLE

BACKGROUND OF THE INVENTION

The present invention relates to a seat device for a vehicle equipped with a sub seat between right and left main seats.

Generally, it is required for right and left rear seats of the vehicle to be moved backward so that there can be provided a cargo space between the front seat and the rear seat or the comfortable sitting can be provided to passengers on the rear seat. However, since a pair of wheel houses projecting inward is generally formed behind the rear seat, the rear seat can not be moved back straightly.

Then, various types of seat devices have been proposed to solve the above-described problem.

Japanese Patent Laid-Open Publication No. 2000-264109 discloses a rear seat for a vehicle, in which a center seat is disposed between right and left seats, and after the center seat has been moved forward, the right and left seats are moved back obliquely so as to approach to each other, whereby these right and left seats can be located between the wheel houses.

In this conventional device, however, since the forward-moved center seat is located just behind the front seat, there is concern that this center seat could be an obstacle to passengers or the like. Also, since additional rails or the like to move the center seat forward is necessary, there is a problem that the structure of seat device would be complicated.

Japanese Utility Model Laid-Open Publication No. 63-179248 discloses a slide seat, in which a foldable seat comprising a seat cushion and a seat back is disposed between right and left seats, and after the seat back of the foldable seat has been folded on the seat cushion and then the foldable seat itself has been folded toward the right seat or the left seat, these right and left seats are moved back obliquely so as to approach to each other, whereby these right and left seats can be located between the wheel houses.

This type of conventional device, meanwhile, has a problem that the right and left seats would be limited to some extent in their approaching due to a total thickness of the folded seat back and seat cushion which are piled on each other.

Japanese Patent Laid-Open Publication No. 7-108864 discloses a seat device for a vehicle, in which on a vehicle rear floor is provided a pair of slide rails formed symmetrically in a substantially Z shape, when viewed from above, which respectively comprise front straight portions which extend longitudinally to provide a wider distance between right and left seats, rear straight portions which extend longitudinally to provide a narrower distance between the right and left seats, and slant portions to obliquely interconnect the front and rear straight portions. Herein, the right and left seats are configured so as to be moved along these slide rails, and these seats are moved back to the rear straight portions of the slide rails, whereby these right and left seats can be located between the wheel houses.

In this conventional device, although the both seats located between the wheel houses can provide a bench seat mode, the both seats moved forward are separated from each other and thus the bench mode can not be provided at this location. Namely, this type of seat device has a problem that it is impossible to provide the bench seat mode in both front and rear positions, and also the above-described slide rails which may be rather complex are required.

SUMMARY OF THE INVENTION

The present invention has been devised in view of the above-described problems, and an object of the present invention is to provide a seat device for a vehicle which can adjust the width of the seat variably, without improperly affecting spaces behind or before the seat, thereby attaining both the movement of seat and the improvement of space utility.

According to the present invention, there is provided a seat device for a vehicle comprising a pair of main seats disposed in the vehicle width direction including respectively main seat cushions and main seat backs, and a sub seat back disposed between the main seat backs, wherein the sub seat back is configured so as to be in an arranged position in which the sub seat back is located above the main seat cushion and before the main seat back, and the main seat backs are configured so as to be moved inward in the vehicle width direction when the sub seat back is in the arranged position.

Accordingly, since the sub seat back is located above the main seat cushion and before the main seat back when it is in its arranged position, the sub seat back does not project forward or rearward from the main seats. As a result, the width of the seat can be adjusted variably, without improperly affecting spaces behind or before the seat. Namely, in the state where the sub seat back is located between the main seat backs, the width of the seat can be made wider. Meanwhile, when the sub seat back is in its arranged position, the width of the seat can be made narrower by moving the main seat backs inward in the vehicle width direction. Thus, both the movement of seats and the improvement of space utility can be attained properly.

According to a preferred embodiment, the seat device further comprises a sub seat cushion which is provided between the main seat cushions, and the sub seat cushion is configured so as to be in its arranged position in which the sub seat cushion is located above the main seat cushion and before the main seat back, and the main seat backs are configured so as to be moved inward in the vehicle width direction when the sub seat cushion is in its arranged position.

Accordingly, since the sub seat cushion is located above the main seat cushion and before the main seat back when it is in its arranged position, the sub seat cushion does not project forward or rearward from the main seats. As a result, the width of the seat comprising seat cushion and seat back can be adjusted variably, without improperly affecting spaces behind or before the seat.

Namely, although the main seats are independent seats, when the sub seat (the sub seat cushion and the sub seat back) is located between the main seats, the width of the seat can be made wider. Meanwhile, when the sub seat is in its arranged position, the width of the seat can be made narrower by moving the main seat backs inward in the vehicle width direction. Thus, both the movement of seats and the improvement of space utility can be attained properly.

According to another preferred embodiment, the sub seat cushion is configured so as to be located below the sub seat back when the sub seat back and sub seat cushion are in the arranged position respectively.

Accordingly, since the sub seat cushion in the arranged position is located below the sub seat back so as to be hidden, a proper appearance can be provided and the sub seat cushion will not be an obstacle to any things.

According to another preferred embodiment, the sub seat back is configured so as to be used as an armrest when the sub seat back is in its arranged position.

Accordingly, since the sub seat back in the arranged position is used as the armrest, the comfortable sitting can be provided to the passengers on the seat.

According to another preferred embodiment, the main seats are configured so as to be moved back obliquely so as to approach each other.

Accordingly, since slide rails for the lateral movement or the longitudinal movement are not necessary, the main seats can be moved backward with a simple structure.

According to another preferred embodiment, the seat device further comprises a seat slide rail extending straightly, by which the main seats are moved back obliquely.

Accordingly, the main seats can be moved back obliquely with the simple structure of the seat slide rail.

According to another preferred embodiment, there is provided a pair of wheel houses projecting inward in the cabin behind the main seats, and the main seats are configured so as to be in a position between the wheel houses.

Accordingly, since the main seats are moved so as to be in the position between the wheel houses projecting inward in the cabin, the improvement of comfortable sitting of the passengers on the main seats can be attained.

According to another preferred embodiment, the sub seat back is supported on either one of the main seats, and the main seats are configured so as to be moved forward so that a specified space can be formed between the main seats.

Accordingly, this space which is formed between the main seats moved forward can provide some cargo space for relatively long things.

According to another preferred embodiment, the sub seat back and sub seat cushion are configured so as to be moved respectively to the arranged position thereof, being separated from the main seat back and main seat cushion respectively, and there is provided a sub-seat operational linkage which is configured so as to move the sub seat cushion to the arranged position, linking with the movement of the sub seat back to the arranged position. The main seats may be set as right and left rear seats for rear passengers.

Accordingly, since the sub-seat operational linkage moves the sub seat cushion to the arranged position, linking with the movement of the sub seat back to the arranged position, it will not be necessary that the sub seat back and the sub seat cushion are operated separately to be moved to the arranged position. Thus, the operability can be improved. Also, since the sub seat back and sub seat cushion are separated from the main seat back and main seat cushion respectively in the arranged position, the width of the seat can be adjustable so as to be narrower after the sub seat back and sub seat cushion have been moved to the arranged position.

According to another preferred embodiment, the sub-seat operational linkage is configured so as to return the sub seat cushion to the returned position where the sub seat cushion is adjacent to the main seat cushion, linking with the return of the sub seat back to the returned position where sub seat back is adjacent to the main seat back. The returned position may be set as a normal position.

Accordingly, since the sub-seat operational linkage operate the both together in the both movement directions between the returned position (normal position) and the arranged position, the operability can be improved further.

According to another preferred embodiment, the sub seat cushion is configured so as to be in the arranged position in which the sub seat cushion is located above the main seat cushion and before the main seat back.

Accordingly, since the sub seat cushion is located above the main seat cushion and before the main seat back when it is in its arranged position, the sub seat cushion does not project forward or rearward from the main seats. As a result, the width of the seat can be adjusted variably, without improperly affecting spaces behind or before the seat.

Namely, although the main seats are independent seats, in the state where the sub seat (the sub seat cushion and the sub seat back) is located between the main seats, the width of the seat can be made wider. Meanwhile, when the sub seat is in its arranged position, the width of the seat can be made narrower by moving the main seats inward in the vehicle width direction. Thus, both the movement of the seat and the improvement of space utility can be attained properly.

According to another preferred embodiment, the sub seat cushion is configured so as to be located below the sub seat back and the sub seat back is configured so as to be available for the armrest when the sub seat back and sub seat cushion are in the arranged position respectively.

Accordingly, since the sub seat cushion is located below the sub seat back when the sub seat back and the sub seat cushion have been operated together by the sub-seat operational linkage and moved to the arranged position, the proper appearance can be provided. Further, since the sub seat back in the arranged position will be used as the armrest, the improvement of comfortable sitting of passengers can be attained.

According to another preferred embodiment, the main seat backs and main seat cushions are configured so as to be moved inward in the vehicle width direction and approach each other when the sub seat back and sub seat cushion are in the arranged position.

Accordingly, the main seat backs and main seat cushions can be adjustable in the vehicle width direction when the sub seat is in the arranged position.

Other features, aspects, and advantages of the present invention will become apparent from the following description which refers to the accompanying drawings.

DETAINED DESCRIPTION OF THE INVENTION

Figure 1:
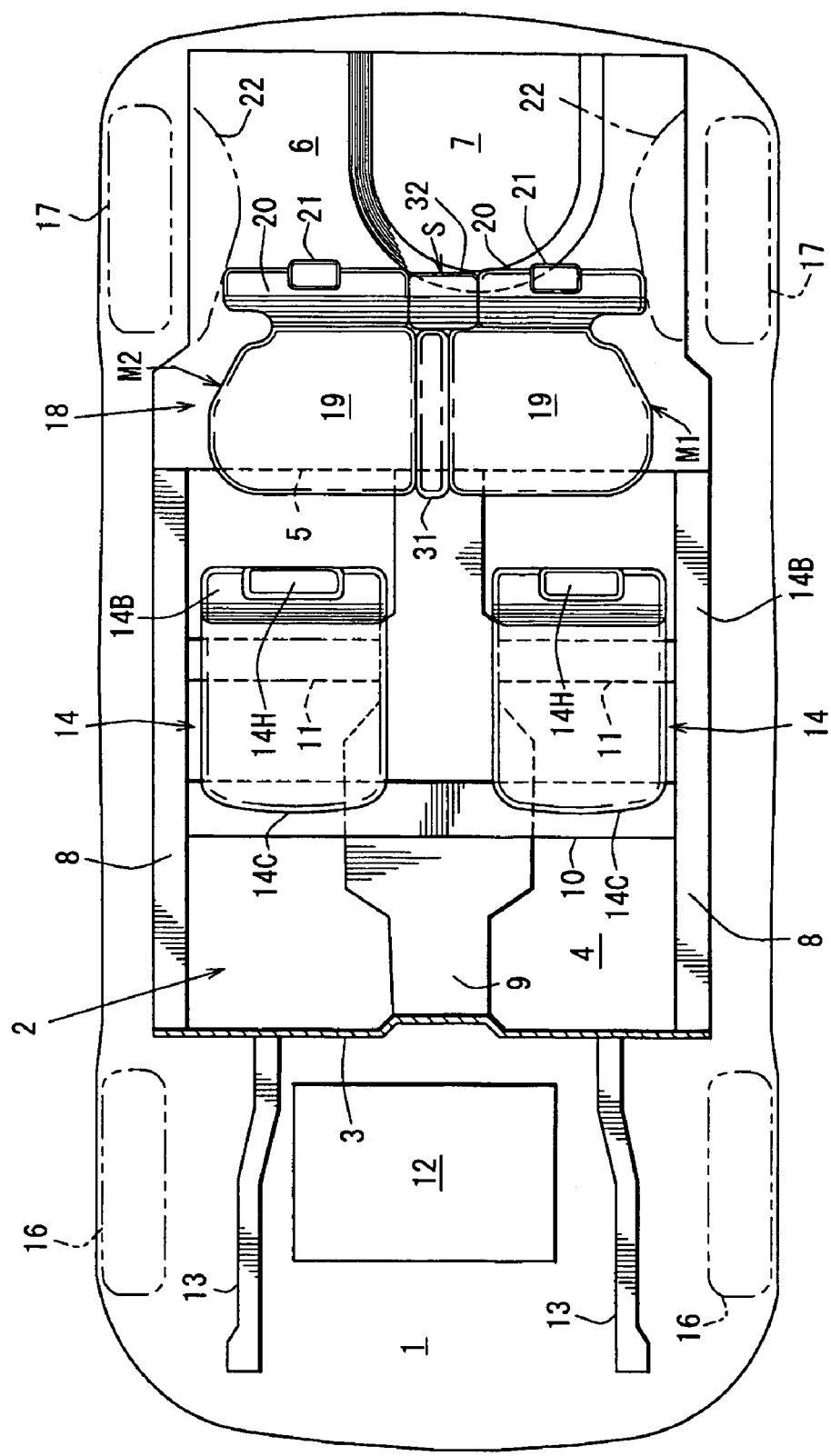
FIG. 1 is a plan view of a vehicle equipped with a seat device for a vehicle according to the present invention.

Hereinafter, preferred embodiments of the present invention will be described referring to the accompanying drawings. It should be understood that even though embodiments are separately described, single features thereof may be combined to additional embodiments. Although the drawings illustrate a seat device for a vehicle, at first a vehicle body structure will be described referring to FIGS. 1 and 2. There is provided a dash lower panel (dash panel) 3 to separate between an engine 1 and a cabin 2 longitudinally. A floor panel 4, which extends substantially horizontally and backward, is connected with a lower rear end of the dash lower panel 3, and a rear floor 6 is connected with a rear portion of the floor panel 4 via a kickup portion 5.

A spare tire pan 7 is formed at the center of the above-described rear floor 6 (a rear portion of the floor panel) so as to be located at a lower level. And, a pair of side sills 8, 8, which extend longitudinally as a vehicle-body rigidity member, is fixed to the both-side ends of the floor panel 4. Each side sill 8 is formed of a side sill inner, a side sill reinforcement, and a side sill outer, which are all connected together, and thus it has a side sill closed section extending longitudinally.

Also, at the middle of the above-described floor panel 4 is provided a tunnel portion 9 integrally therewith which projects inside of the cabin 2 and extends longitudinally. This tunnel portion 9 is provided so as to extend longitudinally between the dash lower panel 3 and the kickup portion 5.

There is further provided a cross member 10 (so-called No. 2 cross member) which extends, as a vehicle-body rigidity member, laterally beyond the tunnel portion 9 to the both side sills 8, 8. And, there is provided a pair of cross members 11, 11 (so-called No. 2.5 cross member) which respectively interconnect the tunnel portion 9 and the side sill 8 laterally at a rear location away from the cross member 10, crossing the tunnel portion 9.

Meanwhile, at the both sides in the engine room 1, in which an engine 12 is provided, is provided a pair of front side frames 13, 13 (a front frame) which extend longitudinally as a vehicle-body rigidity member. Then, a pair of floor frames 15, 15 is connected respectively with rear ends of these front side frames 13, 13. These floor frames 15, 15 also extend longitudinally as a vehicle-body rigidity member, which are fixed to the lower face of the floor panel 4.

Herein, a pair of right-and-left front seats 14, 14 is attached on the respective cross members 10 and 11. Each front seat 14 comprises a seat cushion 14C, a seat back 14B and a headrest 14H. One of these front seats 14, 14 is for a driver seat and the other is for a passenger seat.

Behind the front seats 14, 14 is provided a rear seats 18 which is disposed on the rear floor 6 near the above-described kickup portion 5. A pair of wheel houses 22, 22 is provided respectively behind the rear seat 18 so as to project inside of the cabin 2. Reference numerals 16 and 17 denote front wheels and rear wheels respectively in FIGS. 1 and 2.

Next, the seat device for a vehicle will be described referring to FIGS. 3 through 8. The rear seat 18 comprises right and left main seats M1 and M2 and a sub seat S which is disposed between the main seats M1 and M2, as illustrated respectively in a perspective view of FIG. 3, a plan view of FIG. 4, an elevation view of FIG. 5, and a side view of FIG. 6.

Figure 4:
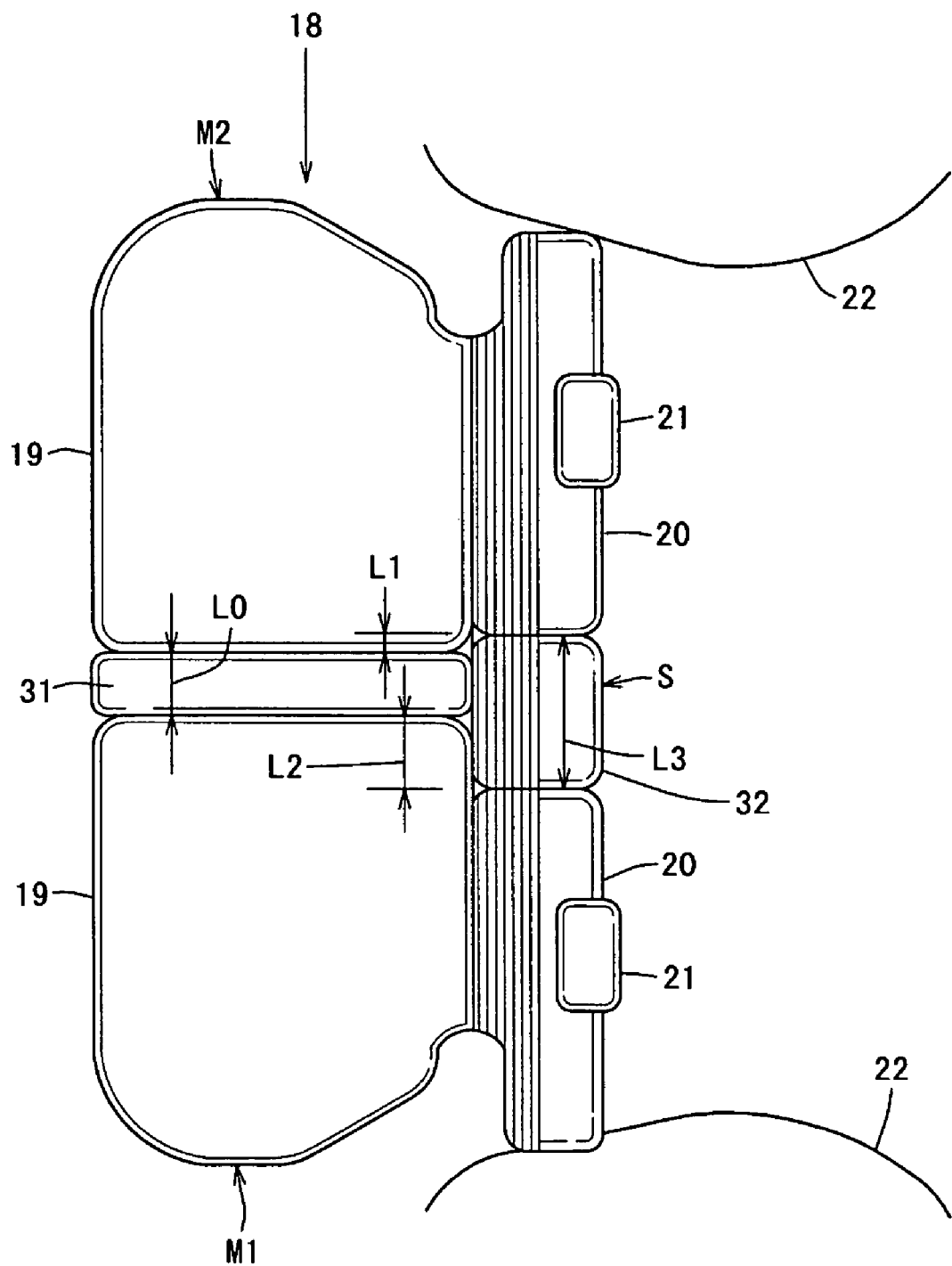
FIG. 4 is a plan view of FIG. 3.

Each of the main seats M1 and M2 comprises a main seat cushion 19, a main seat back 20 and a main headrest 21. As illustrated in FIG. 4, an inside end portion of the left-side main seat back 20 of the left-side main seat M1 (a left seat) is offset outward (toward the outside of vehicle) from an inside portion of the left-side seat cushion 19 by a specified distance L2.

Likewise, an inside end portion of the right-side main seat back 20 of the right-side main seat M2 (a right seat) is offset outward (toward the outside of vehicle) from an inside portion of the right-side seat cushion 19 by a specified distance L1. Herein, the offset distance L2 is set to be greater than the offset distance L1 (L2>L1) in the present embodiment.

Also, in a normal state illustrated in FIG. 4, there is provided a gap L0 for disposing the sub seat S between the main seat cushions 19, 19, and there is also provided a gap L3 for disposing sub seat S between the main seat backs 20, 20 (herein, L3=L0+L1+L2).

The sub seat S includes a sub seat cushion 31 and a sub seat back 32. The sub seat cushion 31 is formed so as to be disposed in the above-described gap L0 between the main seat cushions 19, 19, while the sub seat back 32 is formed so as to be disposed in the above-described gap L3 between the main seat backs 20, 20.

Figure 7:
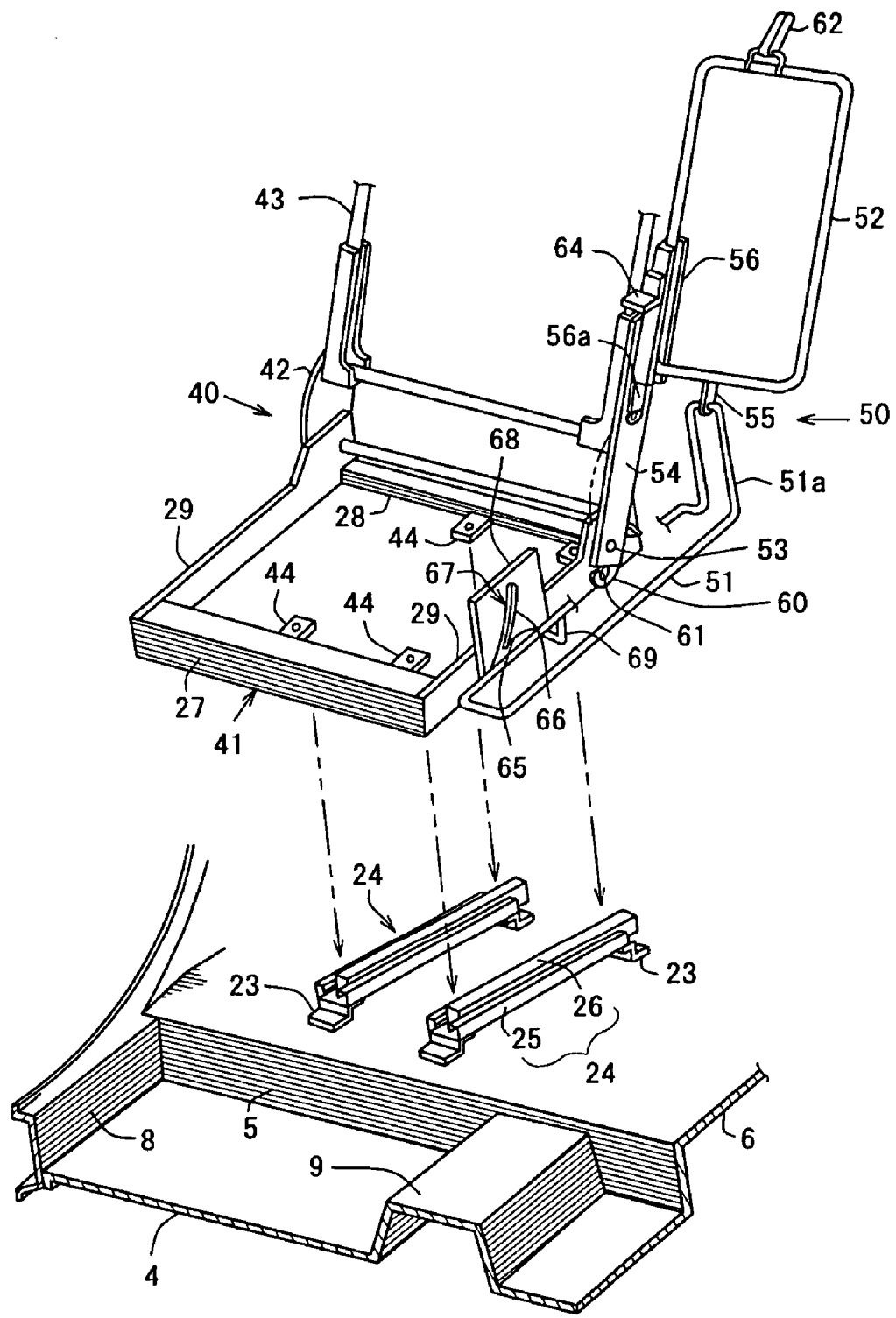
FIG. 7 is an exploded perspective view illustrating a seat support structure and a sub-seat operational linkage.
Figure 8:
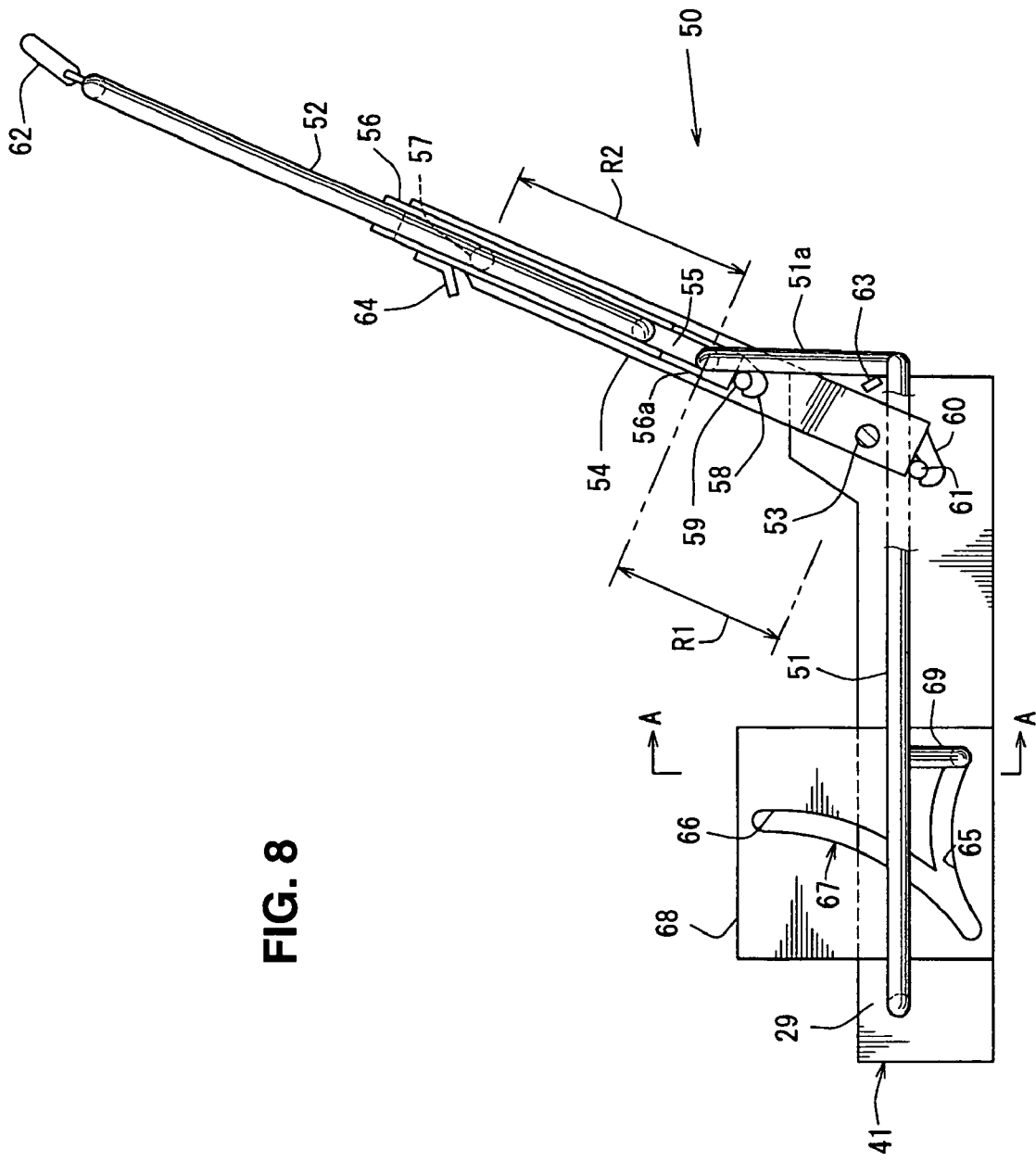
FIG. 8 is a side view illustrating the sub-seat operational linkage in a normal position.

The above-described sub seat cushion 31 and sub seat back 32 are operated by a sub-seat operational linkage 50 illustrated in FIGS. 7 and 8 so as to be located in a normal position and an arranged position respectively. Herein, the normal position is a position where the sub seat cushion 31 has its sitting face which is flat relative to sitting faces of the main seat cushions 19, 19 and the sub seat back 32 has its leaning face which is flat relative to the leaning faces of the main seat backs 20, 20 (see FIGS. 3 through 6). The arranged position is a position where the sub seat cushion 31 and the sub seat back 32 are located above the main seat cushions 19, 19 and before the main seat backs 20, 20, separating from these main seat cushions and backs 19, 19 and 20, 20 (see FIGS. 14 through 17).

Next, a support structure and a frame structure of the main seat M2 and the sub-seat operational linkage 50 will be described referring to FIGS. 7 and 8. Hereinafter, although the support structure and the frame structure will be described only for the right-side main seat M2, the structure for the left-side main seat M1 are symmetrical to those for the left-side main seat M1 with substantially the same structure as those.

Herein, the sub-seat operational linkage 50 is configured so as to move the sub seat cushion 31 to its arranged position, linking with a movement of the sub seat back 32 to its arranged position (see FIGS. 14 through 17), and also returns the sub seat cushion 31 to its normal position, linking with a return of the sub seat back 32 to its normal position (see FIGS. 3 through 6) where the sub seat cushion 31 is adjacent to the main seat cushion 19.

A pair of seat slide rails 24, 24 is attached obliquely on the rear floor 6 via a pair of brackets 23, 23 as illustrated in FIG. 7. Each seat slide rail 24 includes a fixed-side lower rail 25 and a movable-side upper rail 26. Herein, there is provided a pair of seat slide rails 24 for each of the right and left main seats M1 and M2, and their rear ends are located inward relative to their front ends, respectively, thereby guiding the seat M1 and M2 so as to be movable obliquely and approach each other.

A main seat frame 40 supporting the main seat M2 comprises a rectangular seat cushion frame 41 which is formed with a front piece 27, a rear piece 28 and a pair of side pieces 29, 29, and a rectangular seat back frame 43 which is attached to the seat cushion frame 41 via a reclining member 42 such as a reclining knuckle. At the front and rear pieces 27 and 28 are attached a plurality of attachment pieces 44, 44, which are fixed to specified portions of the upper rails 26, 26 of the slide rails 24, 24 via bolts or the like.

The sub-seat operational linkage 50 comprises, as illustrated in FIGS. 7 and 8, a rectangular seat cushion frame 51 which supports the sub seat cushion 31 of the sub seat S, a rectangular seat back frame 52 which supports the sub seat back 32 of the sub seat S, and a support frame 54 which is pivotally attached to the side piece 29 via a pivot 53 (a lower pivot).

The above-described seat cushion frame 51 is formed in a substantially L shape, when viewed from the side, and to its rear end rising portion 51a is pivotally connected the seat back frame 52 via a tongue 55. Herein, the seat back frame 52 is welded to the upper end of the tongue 55, while the rising portion 51a is pivotally attached to the lower end of the tongue 55. Although the single tongue 55 is provided as illustrated in FIGS. 7 and 8, plural tongues 55, 55 may be provided.

A bracket 56 with a U-shaped cross section is welded to the seat back frame 52 at a side of the support frame 54. A central portion of this bracket 56 is pivotally supported on the support frame 54 via a pivot 57 (an upper pivot).

At an extension portion 56a of the bracket 56 is provided a locking hook 58, as a lock member, which is operative to engage with a lock pin 59 projecting from the support frame 54. The engagement of the locking hook 58 with the lock pin 59 ensures the seat back frame 52 in its normal position.

Also, at the lower end of the support frame 54 is provided a locking hook 60, as a lock member, which is operative to engage with a lock pin 61 projecting from the side piece 29 at a side of the main seat frame 40. The engagement of the locking hook 60 with the lock pin 61 ensures the support frame 54 in its normal position, i.e., in a slightly reclining position.

The above-described locking hooks 58 and 60 are configured so as to be unlocked when a lock release lever 62, which is provided at the upper portion of the seat back frame 52 as a lock release member, is operated. Further, a stopper 63 (a lower stopper) to limit a rotational position of the support frame 54 is provided just behind the pivot 53 on the side piece 29 at a side of the main seat frame 40, while a stopper 64 (an upper stopper) to limit a rotational position of the seat back frame 52 is provided just before and upward the pivot 57 on the bracket 56 at a side of the seat back frame 52.

Meanwhile, to the side piece 29 of the main seat frame 40 is fixed a guide plate 68 (a guide member) which includes a guide portion 57. This guide portion 57 comprises a guide groove 65 (or a guide hole) which extends substantially longitudinally with an arc shape, and a guide groove 66 (or a guide hole) which extends substantially vertically with an arc shape, in which the two guide grooves 65 and 66 are continuously combined in a substantially V shape. And, as illustrated in FIG. 9, a front end of a guide rod 69 attached to the seat cushion frame 51 is inserted into this guide portion 67.

Herein, the guide groove 65 of the guide plate 68 illustrated in FIG. 8 is formed with its radius of curvature which corresponds to a distance R1 between the pivot 53 of the lower pivot and the upper end of the rising portion 51a of the seat cushion frame 51. Meanwhile, the other guide groove 66 is formed with its radius of curvature which corresponds to a distance R2 between the pivot 57 of the upper pivot and the upper end of the rising portion 51a of the seat cushion frame 51.

Figure 9:
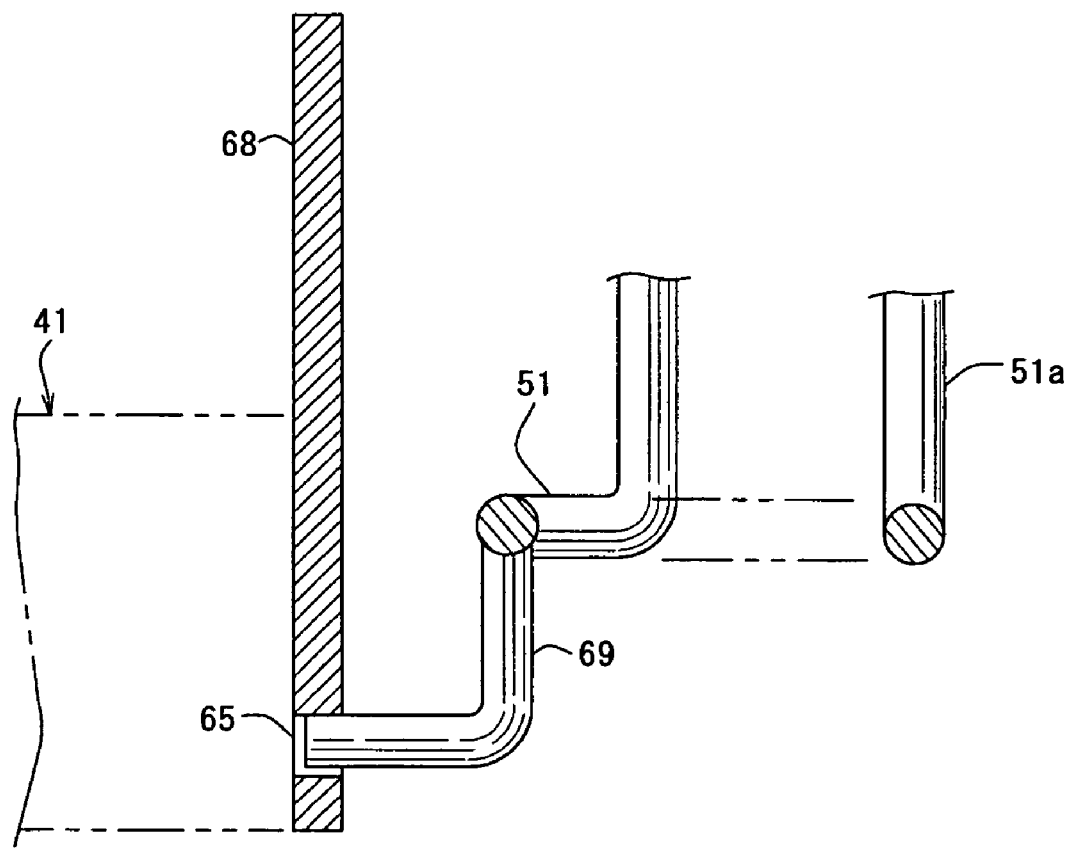
FIG. 9 is a partial sectional view taken along line A-A of FIG. 8.
Figure 10:
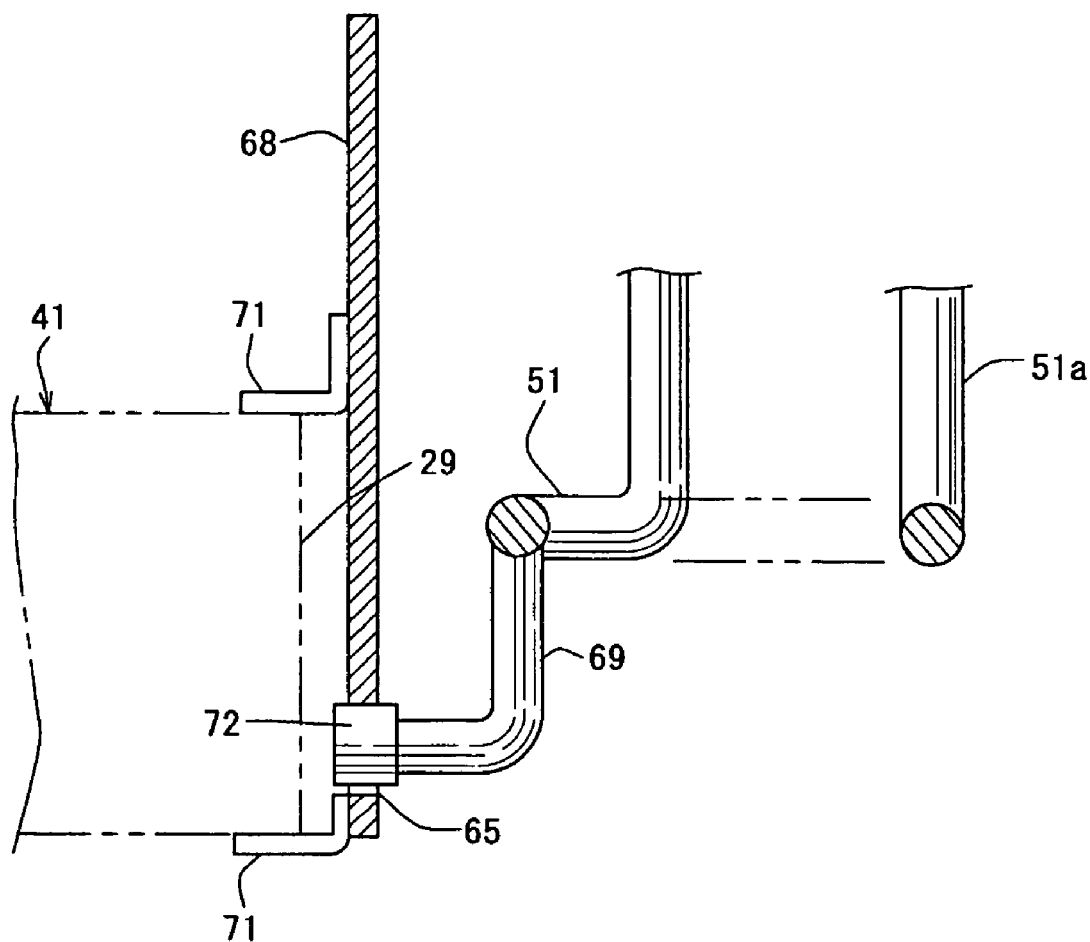
FIG. 10 is an elevation view illustrating a modified guide structure.

Instead of the structure of FIG. 9, as illustrated in FIG. 10, the guide plate 68 may be attached to the side piece 29 of the seat cushion frame 41 via brackets 71, 71 and a bearing 72 may be attached to the tip of the guide rod 69 such that the bearing 72 is inserted into the guide portion 67 comprising the guide grooves 65 and 66 to provide a smooth slide of the guide rod 69.

When the seat cushion frame 51 and the seat back frame 52 are located in their normal position (returned position) by the sub-seat operational linkage 50 illustrated in FIGS. 7 and 8, the sub seat cushion 31 and the sub seat back 32 of the sub seat S are located in their normal position (the returned position) between the main seat cushions 19, 19 and the main seat backs 20, 20 respectively as illustrated in FIGS. 3 through 6. For example, three passengers may be sit on the rear seat 18 in the normal position illustrated in FIGS. 3 through 6.

Figure 11:
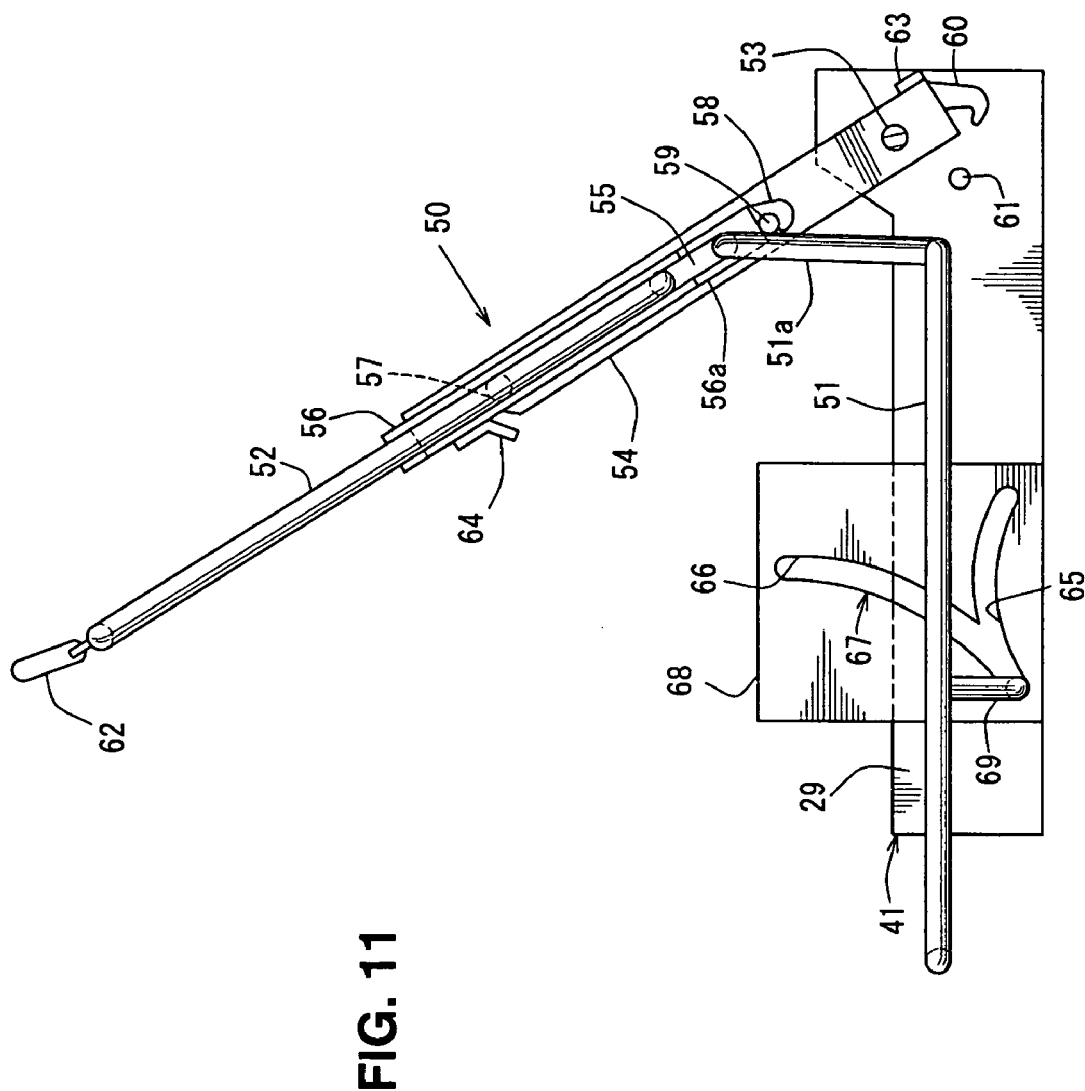
FIG. 11 is a side view illustrating the sub-seat operational linkage in a middle position.

When these sub seat cushion and back 31 and 32 of the sub seat S are respectively separated from the main seat cushion and back 19 and 20 to move to their arranged position (see FIGS. 14 through 17), at first the engagement of the locking hook 60 with the lock pin 61 of FIG. 8 is released, and then the seat back frame 52, bracket 56 and support frame 54 are rotated together forward around the lower pivot 54 by a specified angle from the position illustrated in FIG. 8 to the position illustrated in FIG. 11, and finally their position is limited and fixed to the specified position by the stopper 63.

Figure 12:
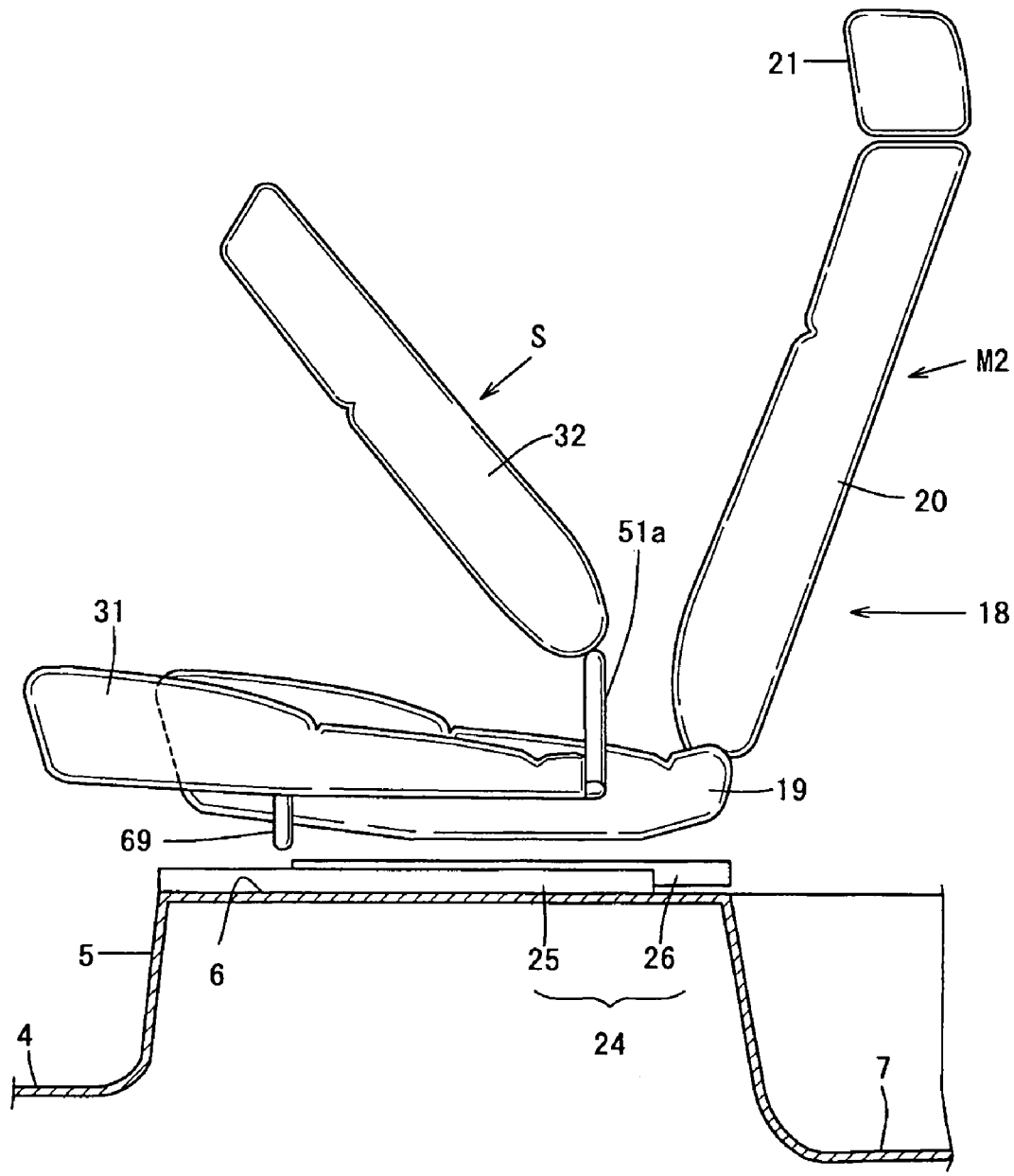
FIG. 12 is a side view illustrating a sub seat in a middle position.

Herein, the seat cushion frame 51 is pushed forward by the tongue 55 and the guide rod 69 is guided forward along the guide groove 65, resulting in a state illustrated in FIG. 11. The sub seat cushion and back 31 and 32 supported by the seat cushion frame 51 and the seat back frame 52 in their position of FIG. 11 are respectively located in their middle position illustrated in FIG. 12, which is located between the normal position (returned position) and the arranged position.

Figure 13:
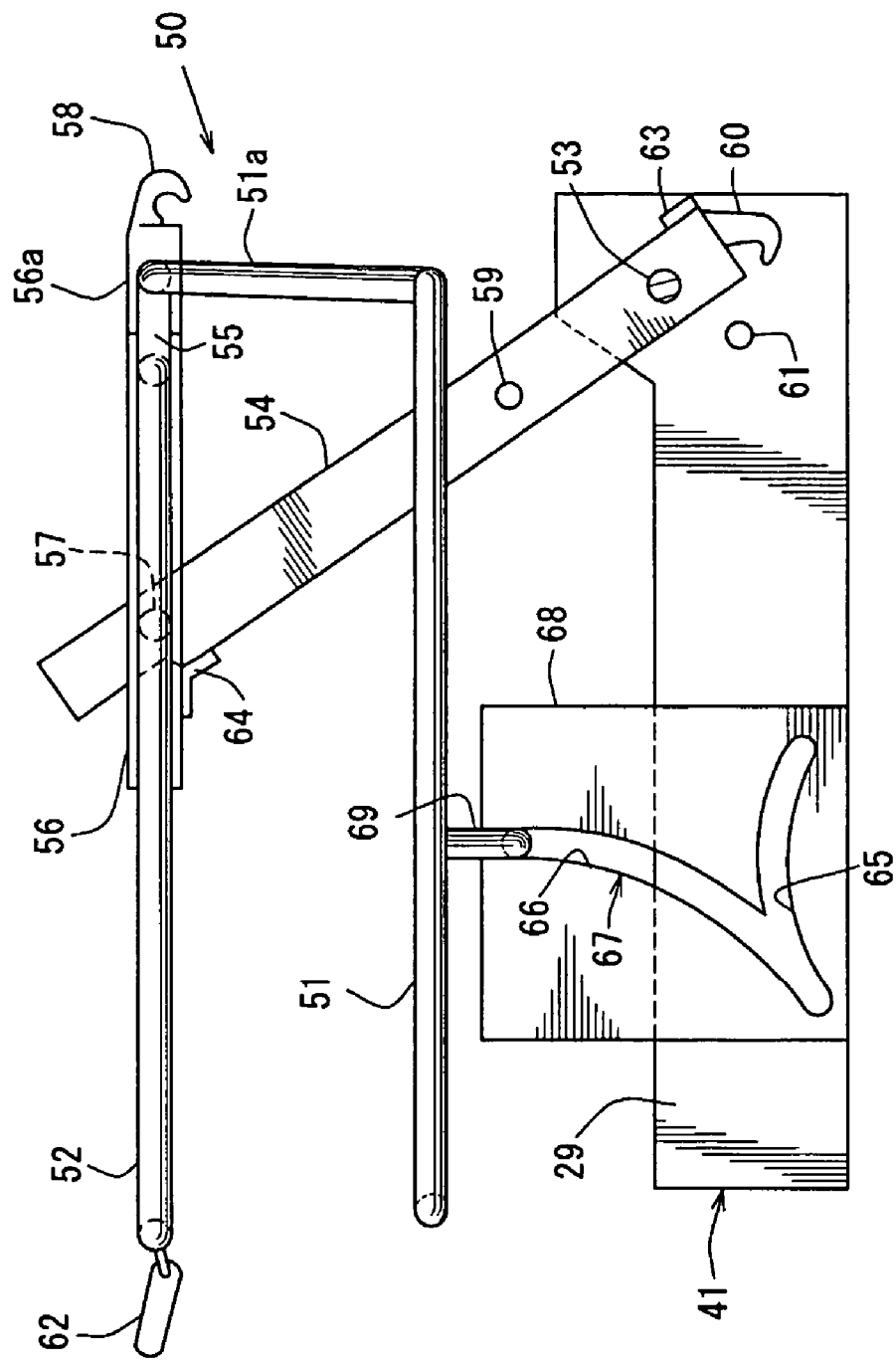
FIG. 13 is a side view illustrating the sub-seat operational linkage in an arranged position.

Next, after the engagement of the locking hook 58 of the sub-seat operational linkage 50 of FIG. 11 at the side of the bracket 56 with the lock pin 59 is released, the seat back frame 52 and bracket 56 are rotated forward together around the upper pivot 57 to the substantially horizontal position illustrated in FIG. 13, where the stopper 64 limits and fix them.

Herein, the seat cushion frame 51 is raised upward by the tongue 55 and the guide rod 69 is guided upward along the guide groove 66, resulting in a state illustrated in FIG. 13. The sub seat cushion and back 31 and 32 supported by the seat cushion frame 51 and the seat back frame 52 in their position of FIG. 13 are respectively located in the arranged position illustrated in FIGS. 14 through 17.

Figure 14:
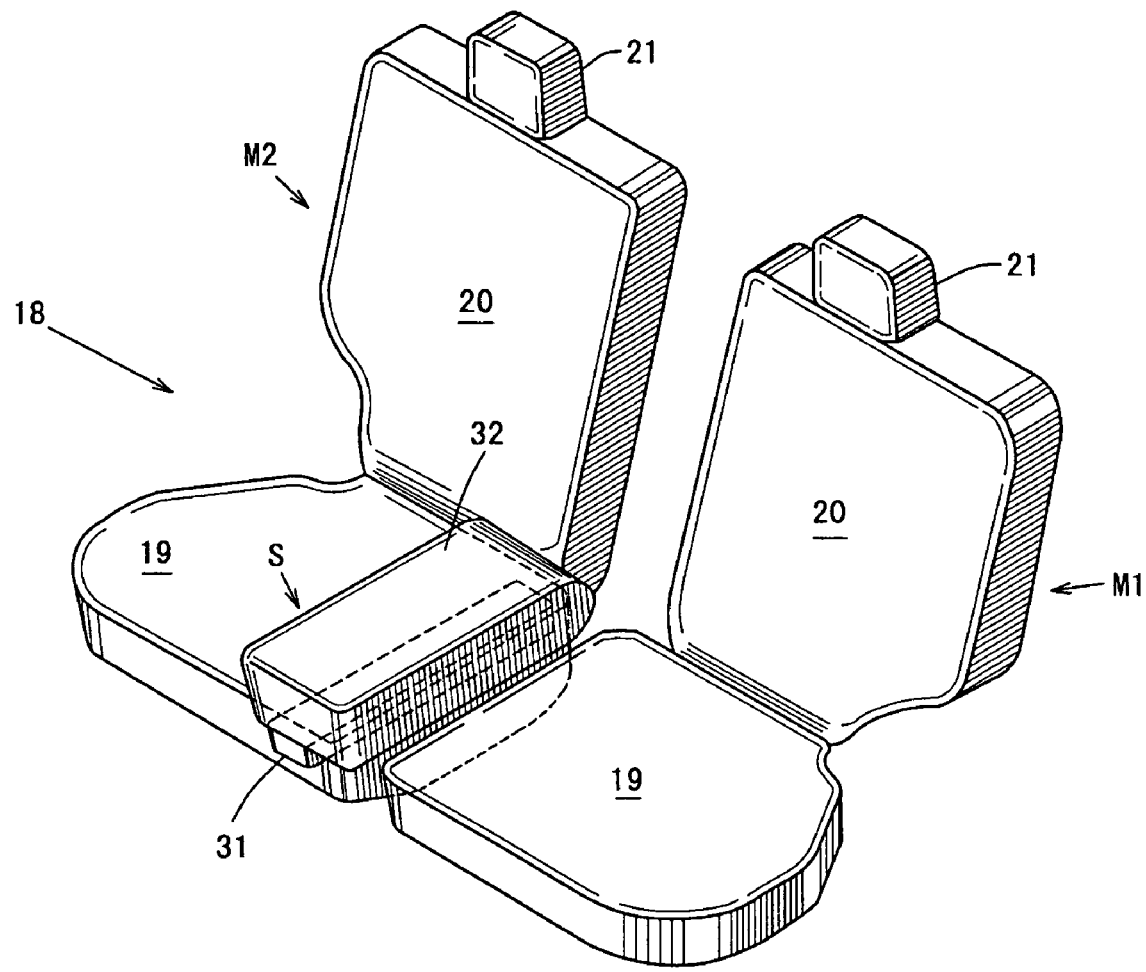
FIG. 14 is a perspective view illustrating the sub asset in an arranged position.
Figure 15:
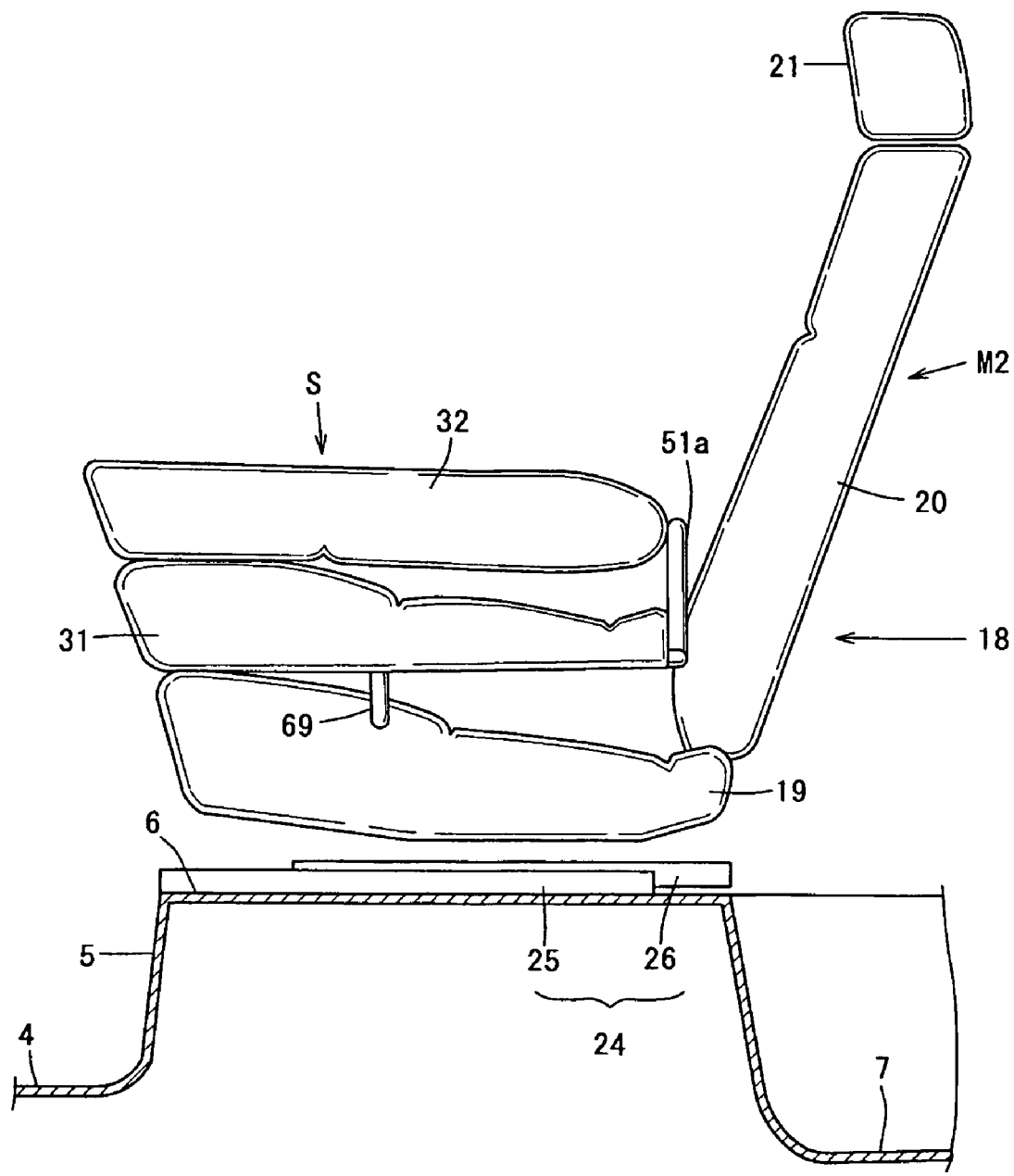
FIG. 15 is a plan view of FIG. 14.
Figure 16:
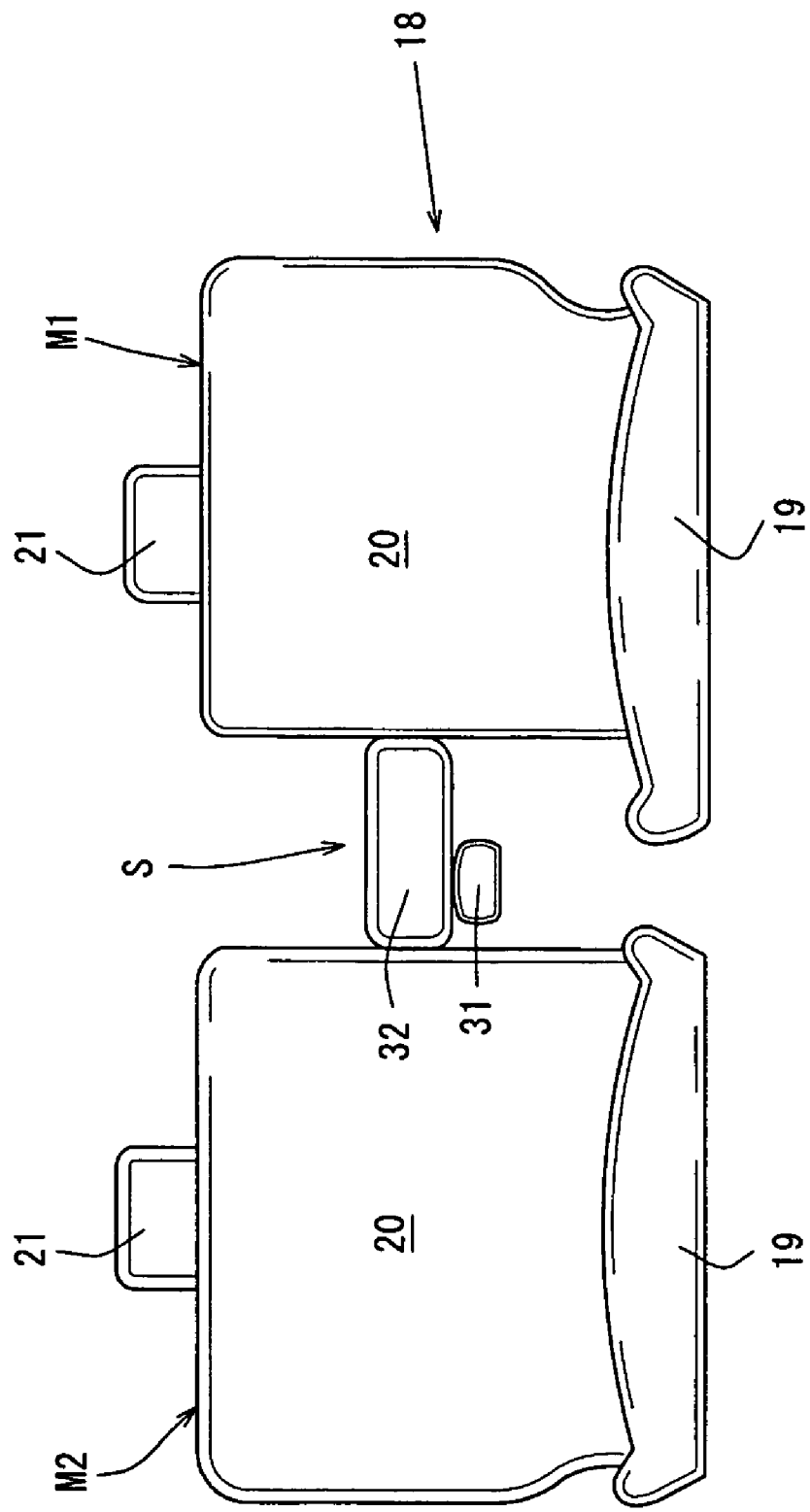
FIG. 16 is an elevation view of FIG. 14.
Figure 17:
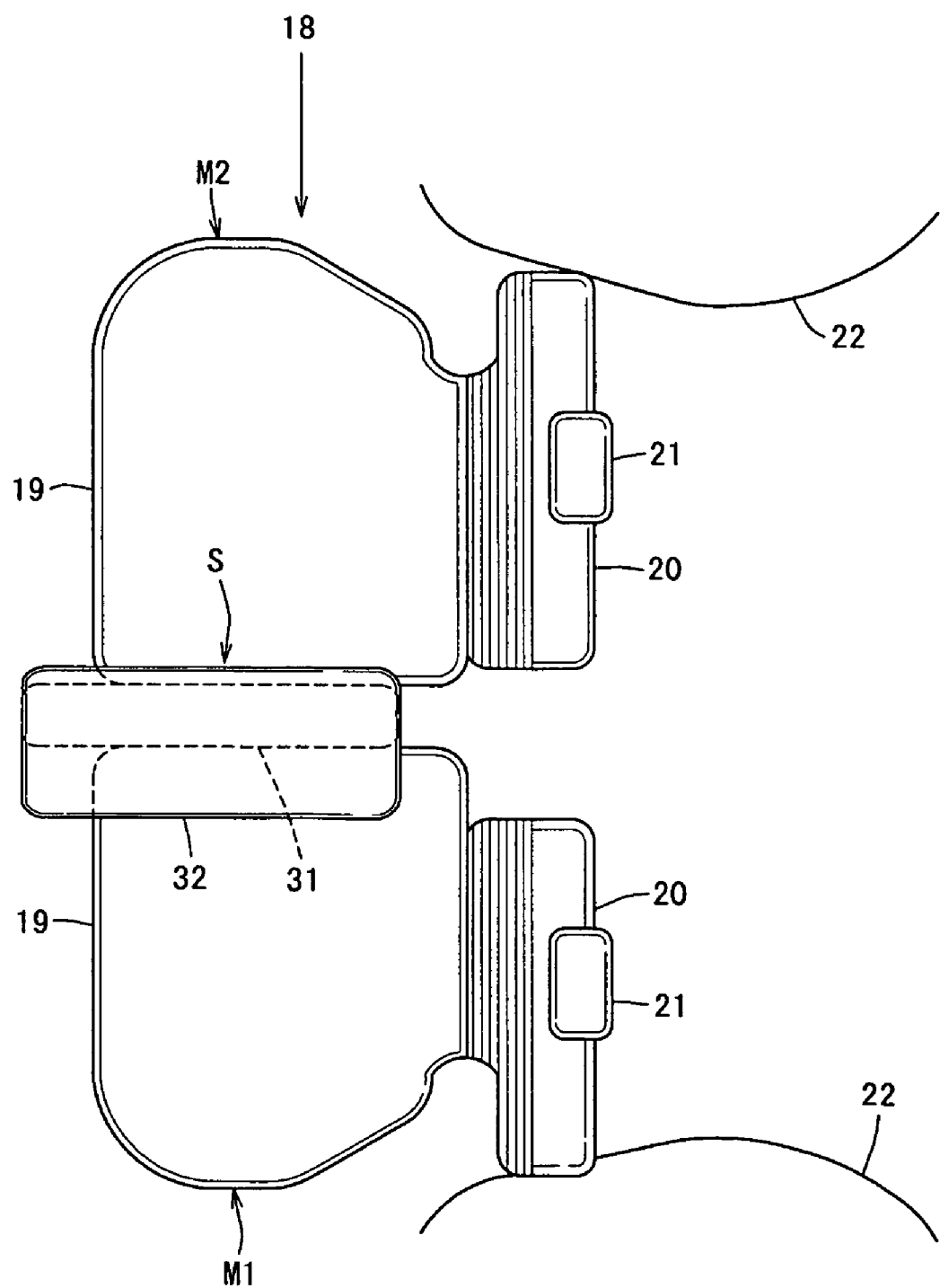
FIG. 17 is a side view of FIG. 14.

FIG. 14 is a perspective view illustrating the arranged position of the sub seat S, FIG. 15 is a side view thereof, FIG. 16 is an elevation view thereof, and FIG. 17 is a plan view thereof. In the arranged position illustrated in FIGS. 14 through 17, the sub seat cushion 31 and the sub seat back 32 are located above the main seat cushion 19 and before the main seat back 20, and the sub seat cushion 31 is located in a hidden position below the sub seat back 32, while the sub seat back 32 is positioned and maintained at a level which is available for an armrest.

Further, as apparent from FIGS. 14 through 17, the movement of the sub seat S to the arranged position will provide a space between the main seats M1 and M2 which has a distance equivalent to L0 and L3 illustrated in FIG. 4. Accordingly, the main seat cushions 19, 19 and the main seat backs 20, 20 are configured to be movable inward of the vehicle.

Figure 18:
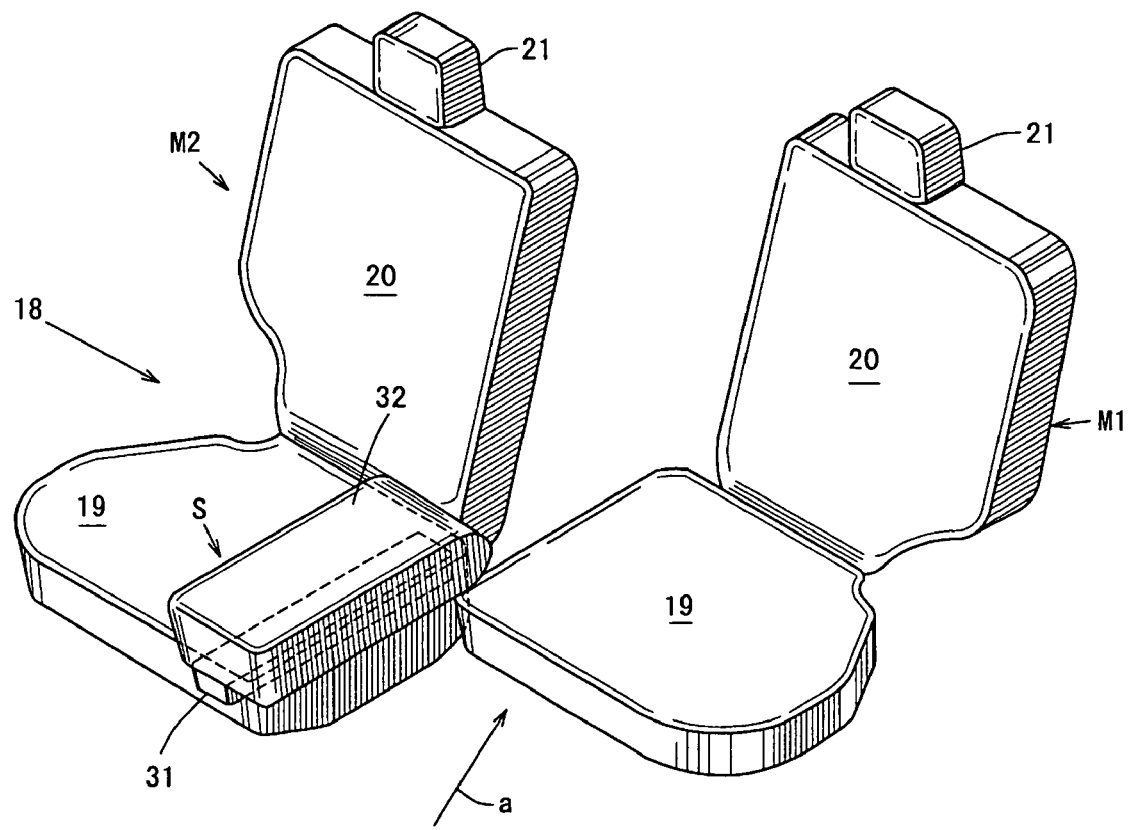
FIG. 18 is a perspective view illustrating a main seat under a rearward movement.
Figure 19:
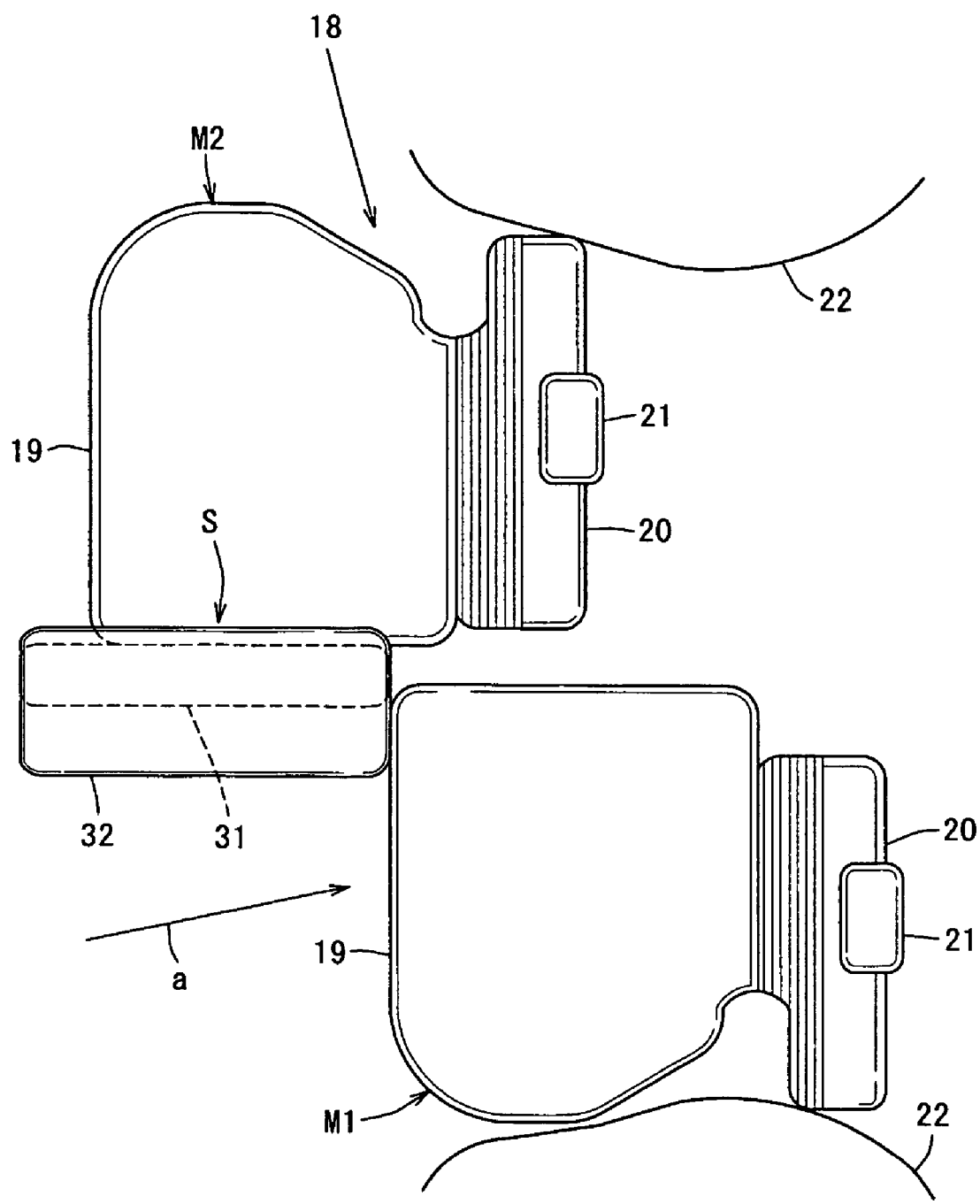
FIG. 19 is a plan view of FIG. 18.
Figure 21:
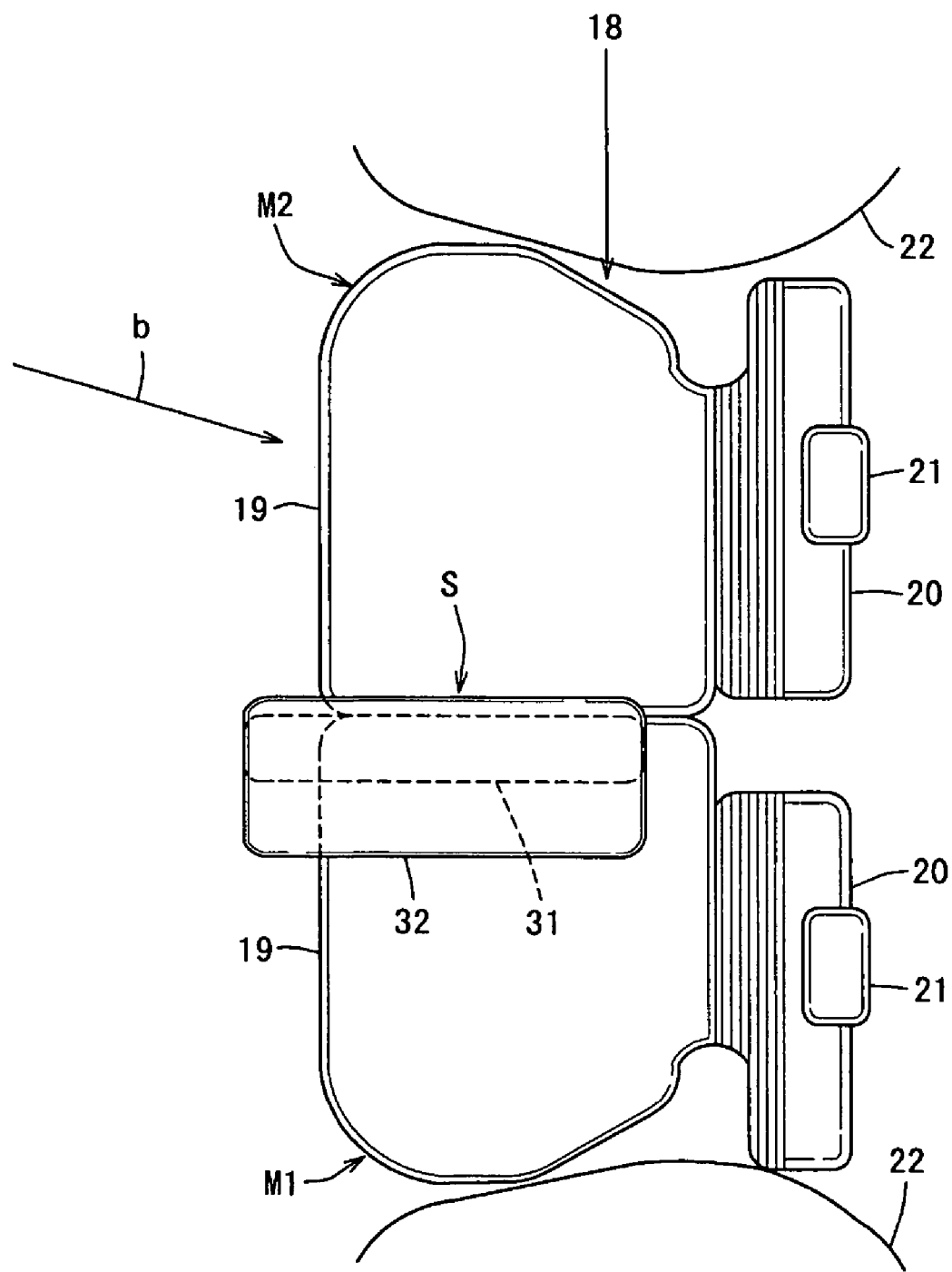
FIG. 21 is a plan view of FIG. 20.

When a pair of main seats M1 and M2 is moved backward from their position illustrated in FIGS. 14 through 17 to their position between the wheel houses 22, 22 illustrated in FIG. 21, at first either one of the main seats of FIG. 17 (the left-side main seat M1 in the figure) is moved back obliquely along the seat slide rails 24 in an arrow a direction illustrated in FIGS. 18 and 19.

Figure 2:
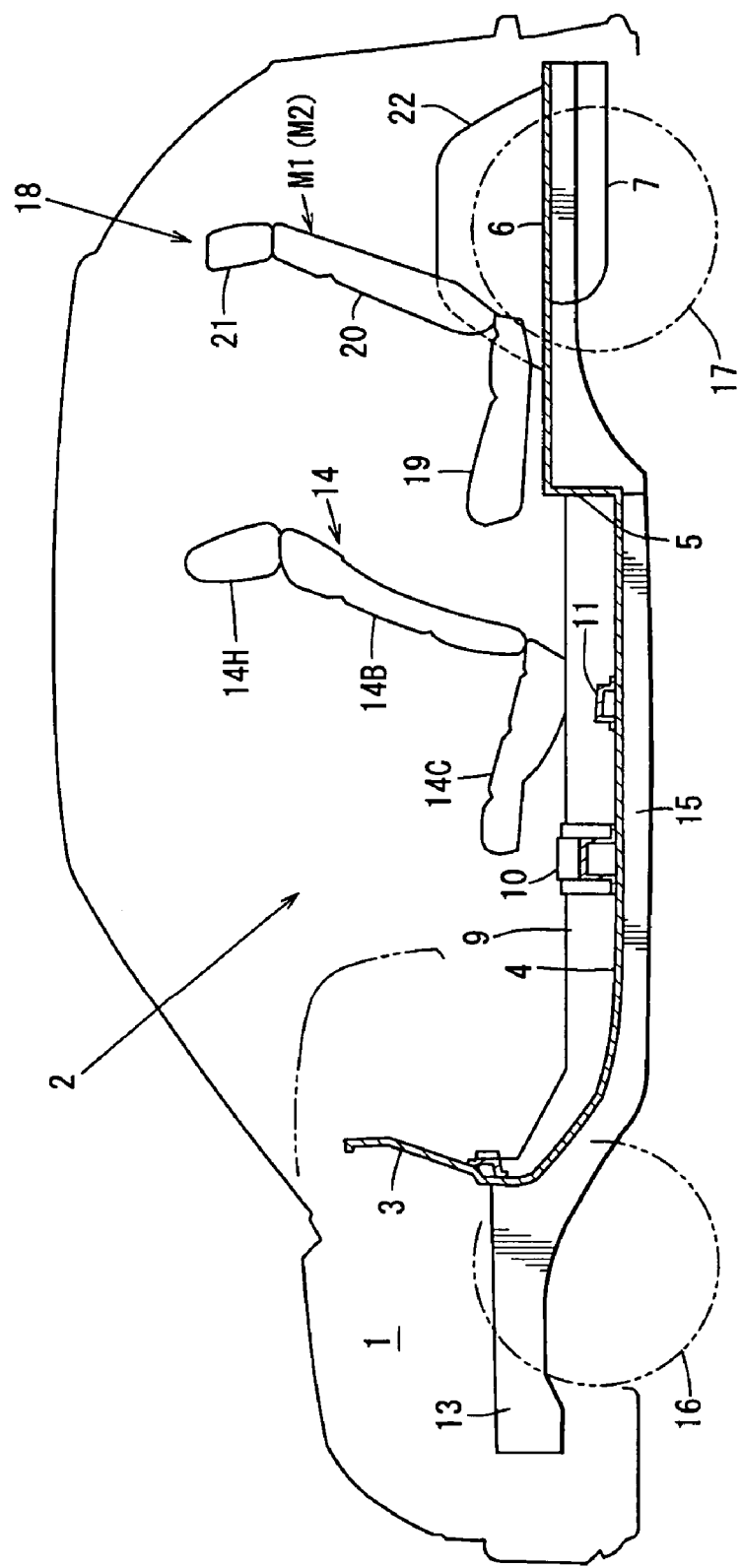
FIG. 2 is a side view of the vehicle.

Subsequently, the other main seat of FIGS. 18 and 19 (the right-side main seat M2 in the figures) is moved back obliquely along the seat slide rails 24 in an arrow b direction illustrated in FIGS. 20 and 2, so that the both main seats M1 and M2 can approach to each other. Thus, a pair of main seats M1 and M2 can be moved backward and located between the wheel houses 22, 22 which project inward of the cabin 2, as illustrated in FIGS. 20 and 21.

Figure 22:
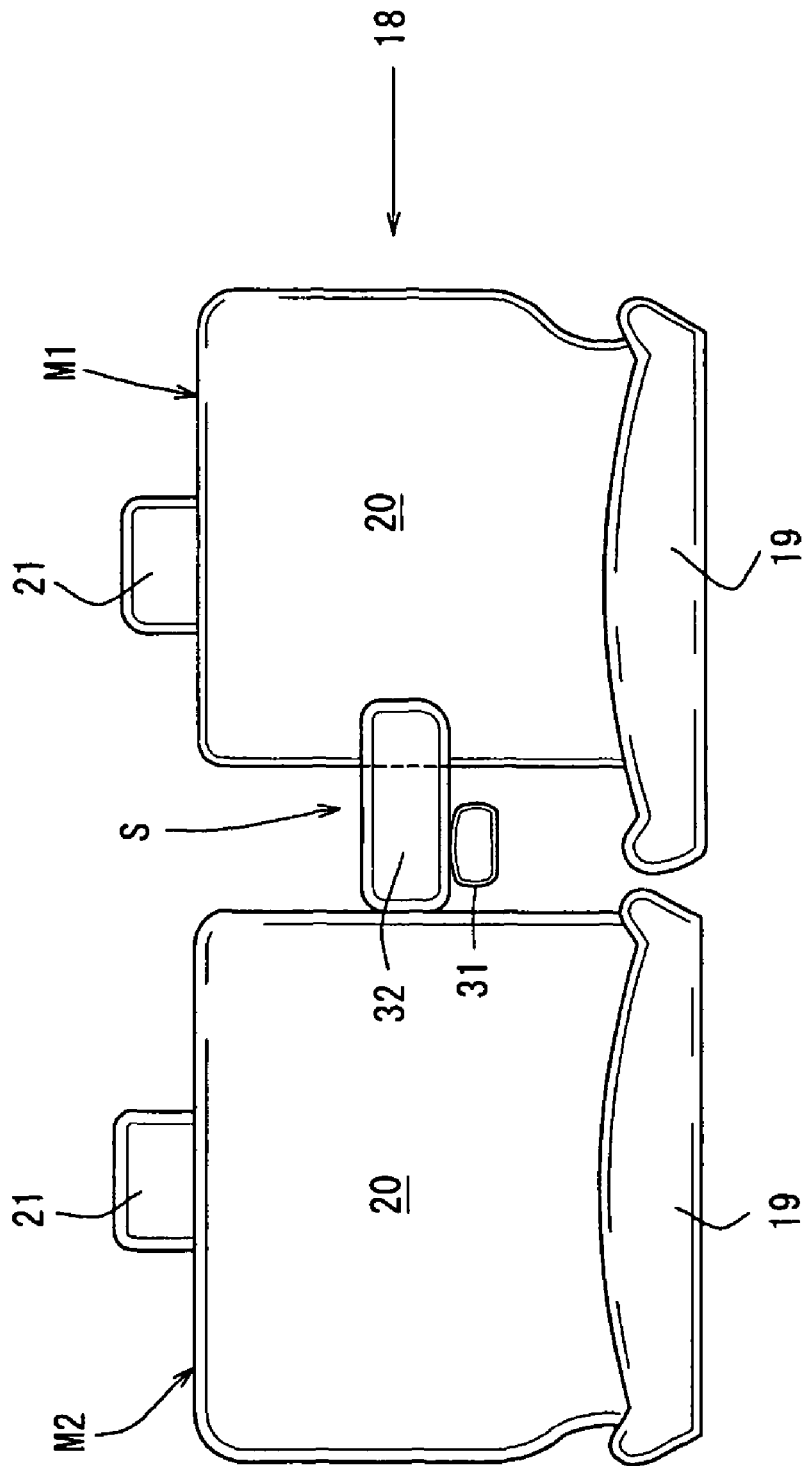
FIG. 22 is an elevation view of FIG. 20.

In FIG. 22 which is an elevation view of FIG. 21, the respective main seat cushions 19, 19 of the main seats M1 and M2 are located to be adjacent to each other, and the sub seat back 32 of the sub seat S is located in the arranged position so as to be available for the armrest of the passenger on the rear seat. In the sate of the main seats M1 and M2 located between the wheel houses 22, 22 illustrated in FIGS. 20 through 22, for example, two passengers can sit on the rear seat 18.

Figure 3:
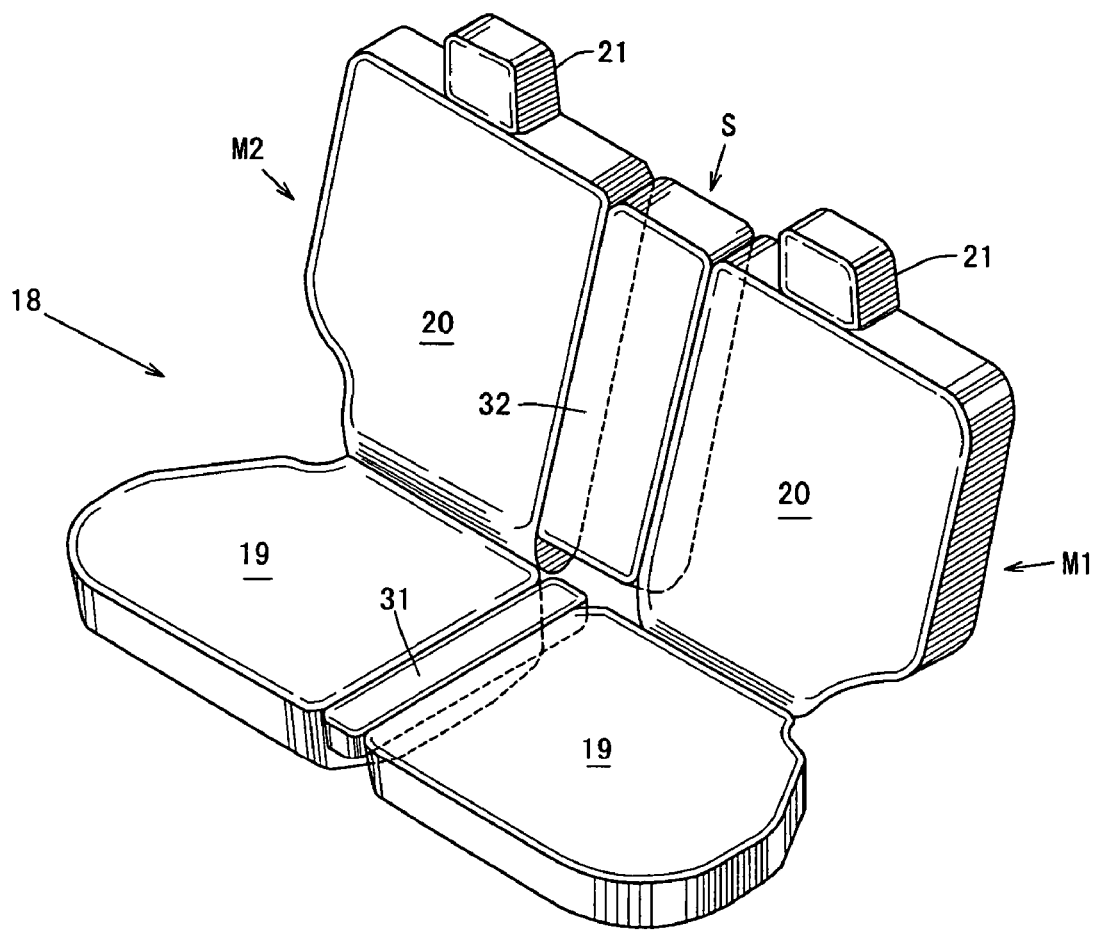
FIG. 3 is a perspective view illustrating a rear seat in a normal position.
Figure 5:
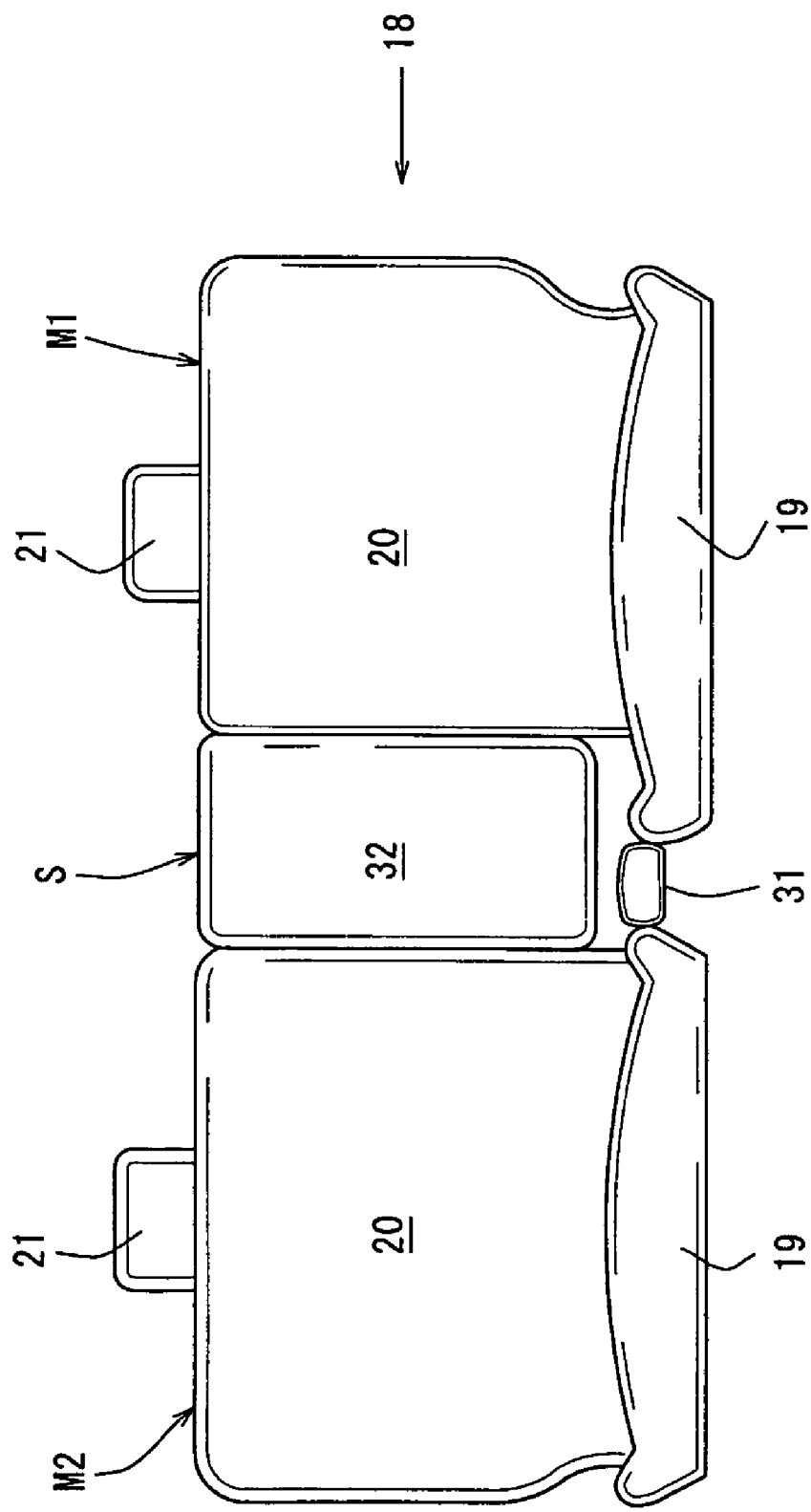
FIG. 5 is an elevation view of FIG. 3.
Figure 6:
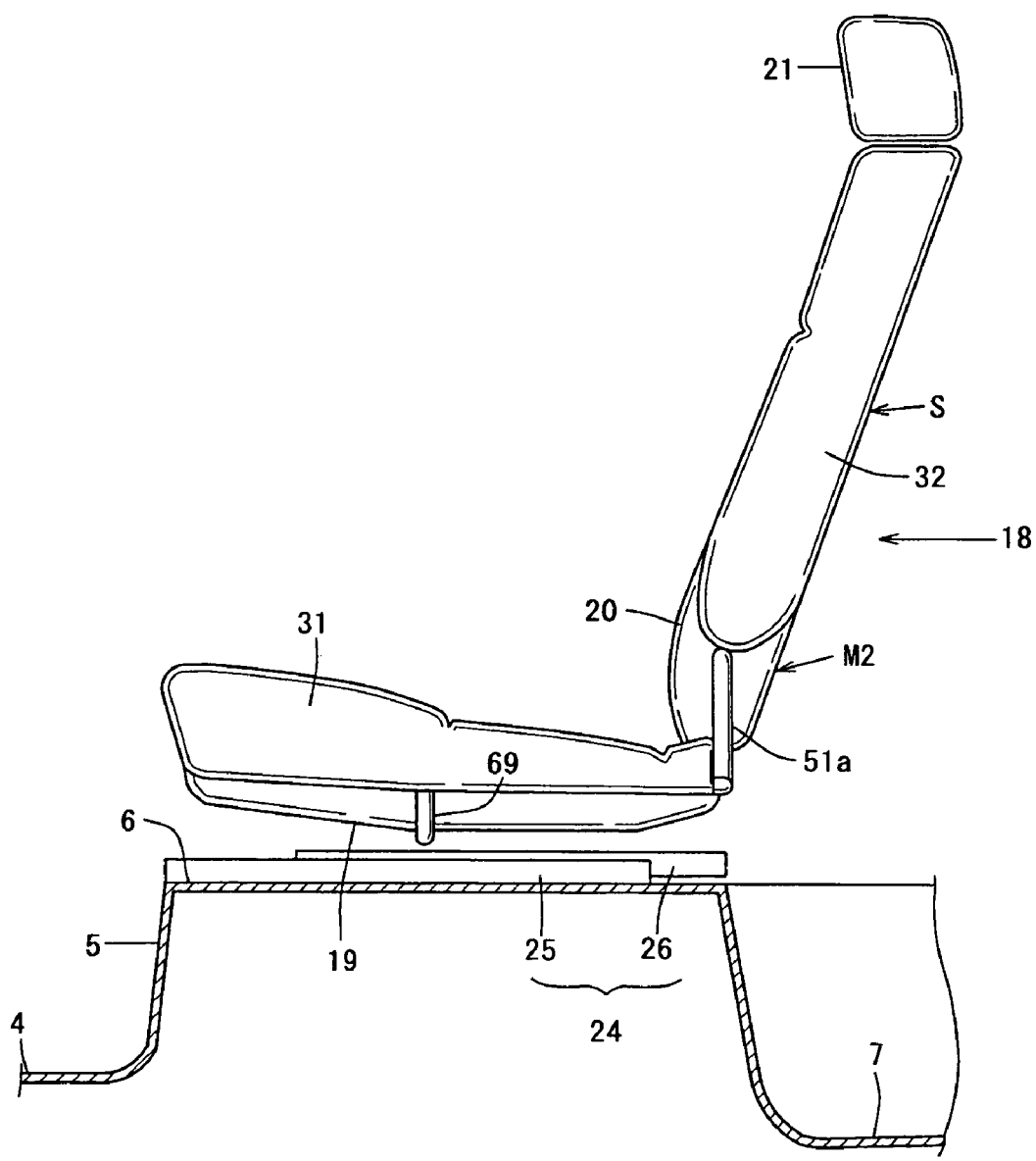
FIG. 6 is a side view of FIG. 3.
Figure 20:
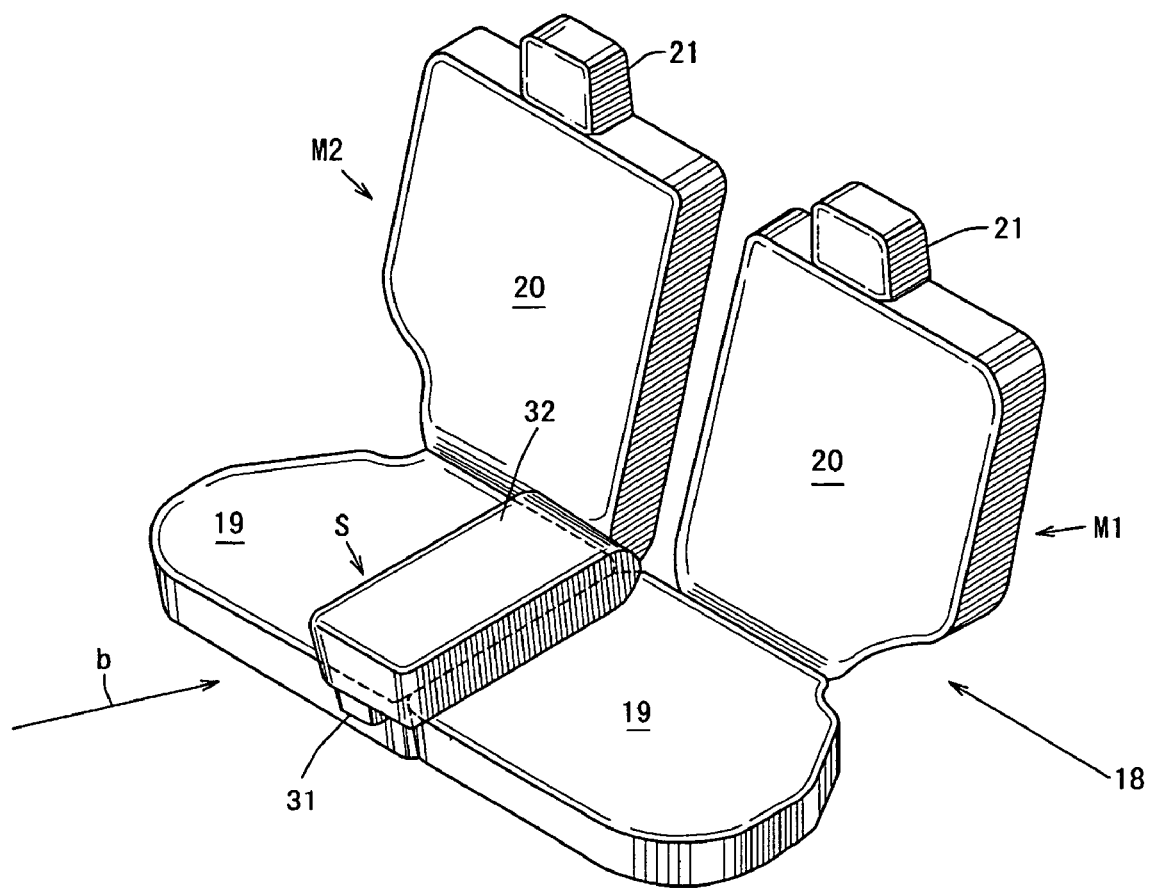
FIG. 20 is a perspective view of the seat located between wheel houses.

Namely, there can be provided the seat standard position illustrated in FIGS. 3, 4 and 5 for three-passenger sitting and the seat standard position illustrated in FIGS. 20, 21 and 22 for the two-passenger sitting.

Figure 23:
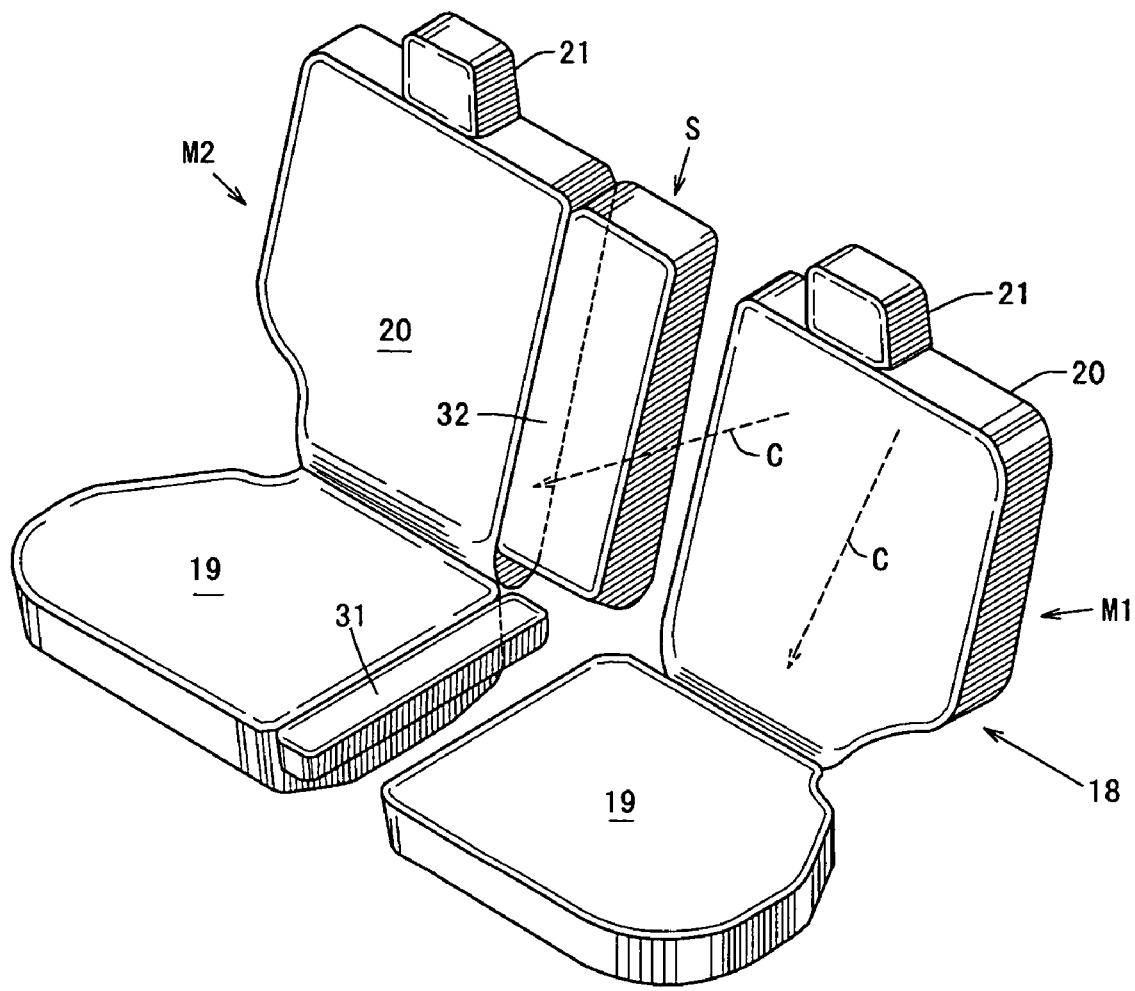
FIG. 23 is a perspective view of the seat which has been moved forward obliquely.
Figure 24:
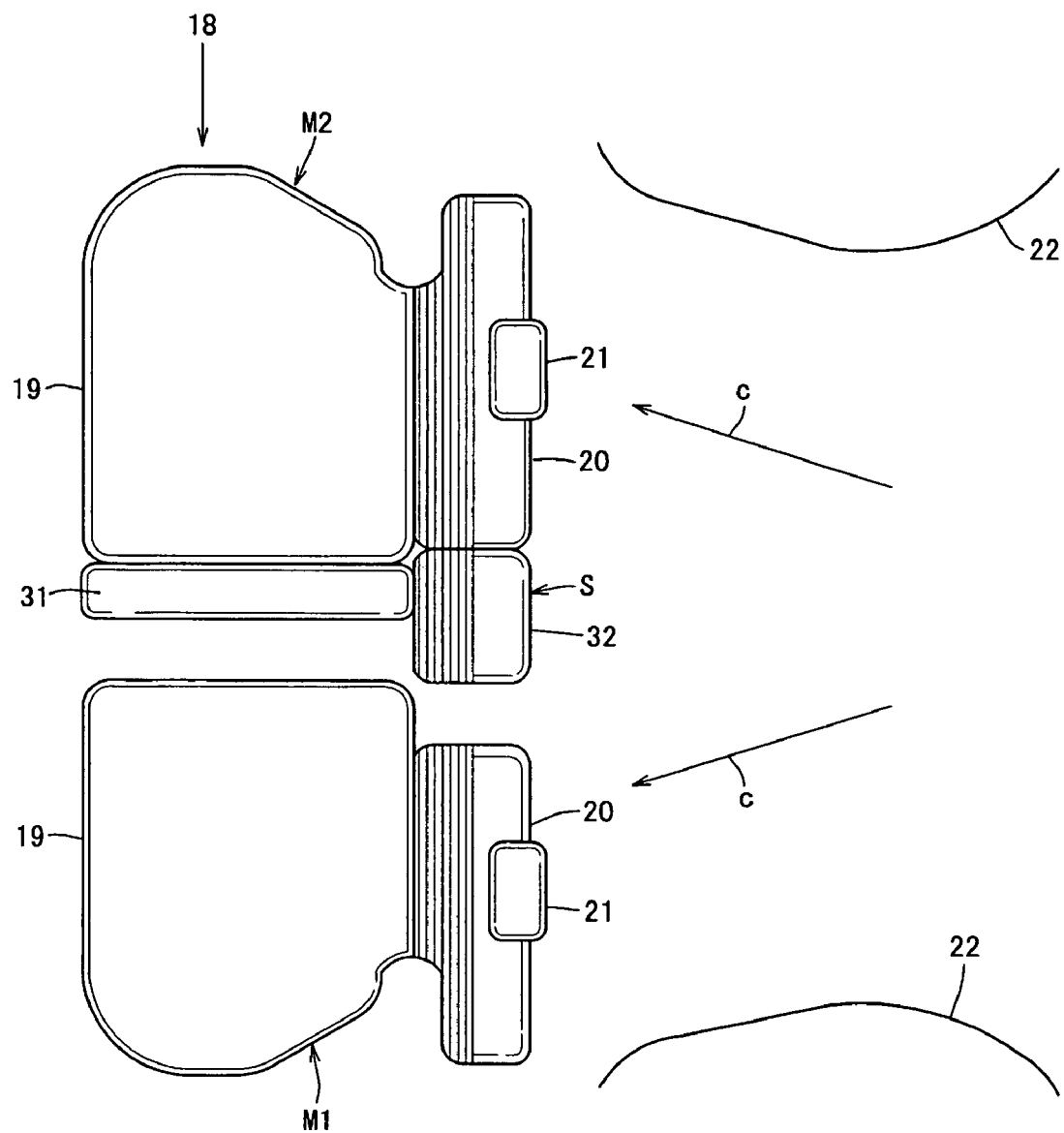
FIG. 24 is a plan view of FIG. 23.
Figure 25:
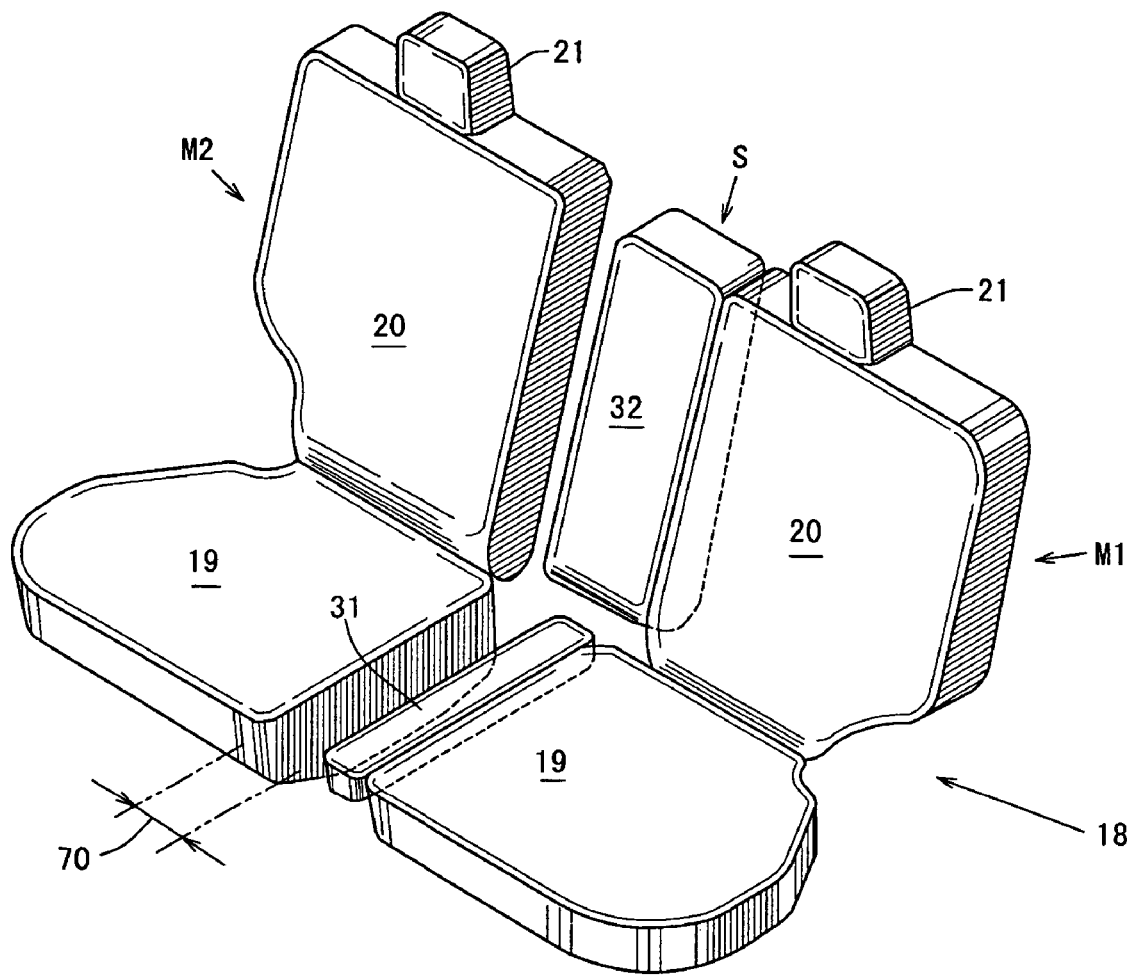
FIG. 25 is a perspective view illustrating a seat device for a vehicle according to another embodiment.
Figure 26:
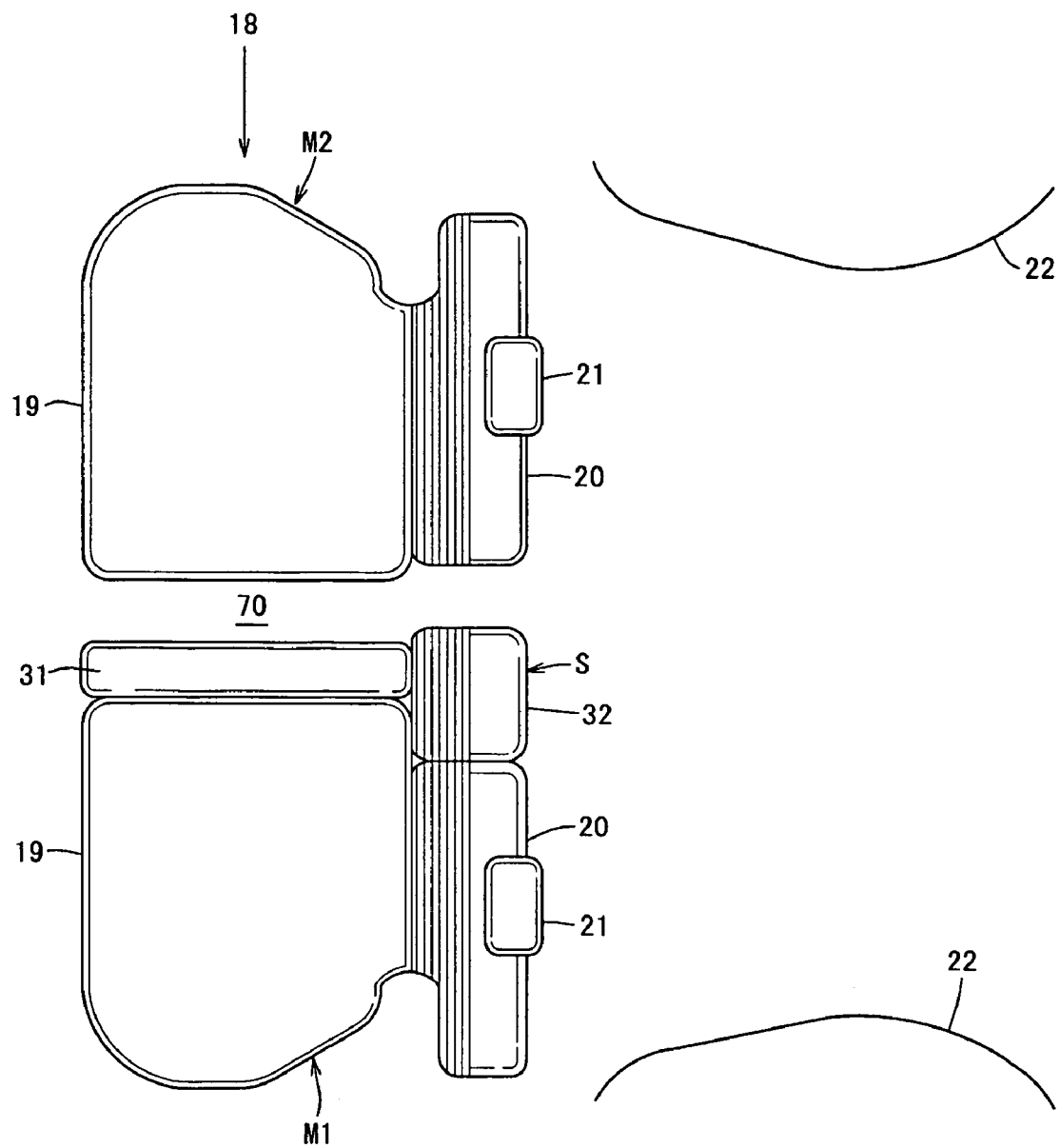
FIG. 26 is a plan view of FIG. 25.

Herein, the main seats M1 and M2 of FIGS. 3 and 4 can be moved forward obliquely along the seat slide rails 24 in an arrow c direction illustrated in FIGS. 23 and 24. In this case, by applying a sub-seat operational linkage which includes a symmetrical structure to the sub-seat operational linkage 50 illustrated in FIGS. 7 and 8 and by attaching the sub seat S to the left-side main seat M1, there can be provided a space 70 extending longitudinally between the main seat M1 with the sub seat S and the main seat M2 without the sub seat S as illustrated in FIGS. 25 and 26. As a result, this space 70 can provide some cargo space for relatively long things.

Figure 27:
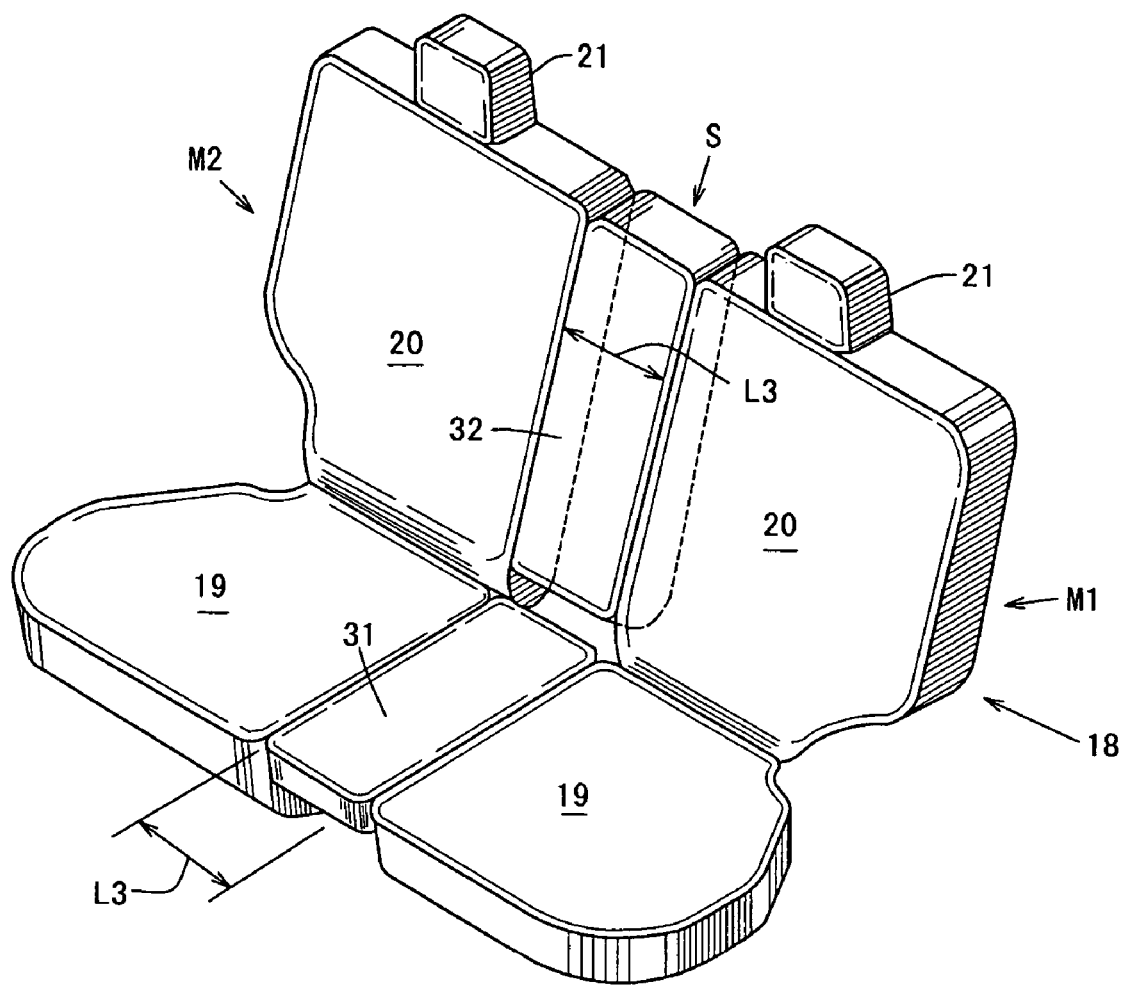
FIG. 27 is a perspective view illustrating a seat device for a vehicle according to further another embodiment.

Although the width L0 (see FIG. 4) of the sub seat cushion 31 of the sub seat S is configured so as to be smaller than the width L3 of the sub seat back 32 in the above-described embodiment, by configuring these width to be substantially the same, as illustrated in FIG. 27, the movement distance of the main seats M1 and M2 can be made greater than that in the above-described embodiment.

As described above, the seat device for a vehicle of the present embodiment comprises a pair of main seats M1 and M2 disposed in the vehicle width direction including respectively the main seat cushion 19 and the main seat back 20, and the sub seat back 32 disposed between the main seat backs 20, 20, wherein the sub seat back 32 is configured so as to be in the arranged position (see FIGS. 14 through 17) in which the sub seat back 32 is located above the main seat cushion 19 and before the main seat back 20, and the main seat backs 20, 20 are configured so as to be moved inward in the vehicle width direction when the sub seat back 32 is in the arranged position.

Accordingly, since the sub seat back 32 is located above the main seat cushion 19 and before the main seat back 20 when it is in its arranged position, the sub seat back 32 does not project forward or rearward from the main seats M1 and M2. As a result, the width of the rear seat 18 can be adjusted variably, without improperly affecting spaces behind or before the rear seat 18. Namely, in the state where the sub seat back 32 is located between the main seat backs 20, 20, the width of the rear seat 18 can be made wider. Meanwhile, when the sub seat back 32 is in its arranged position, the width of the rear seat 18 can be made narrower by moving the main seat backs 20, 20 inward in the vehicle width direction.

Thus, both the movement of seats and the improvement of space utility can be attained properly. Particularly, since the sub seat cushion and back 31 and 32 do not project forward or rearward from the main seats M1 and M2 when the sub seat S is in its arranged position, there cam be provided a wide foot space for passengers sitting on the rear seat 18. Also, since the sub seat S does not project rearward, the cargo space is affected improperly.

Also, the seat device further comprises the sub seat cushion 31 which is provided between the main seat cushions 19, 19, wherein the sub seat cushion 31 is configured so as to be in its arranged position (see FIGS. 14 through 17) in which the sub seat cushion 31 is located above the main seat cushion 19 and before the main seat back 20, and the main seat backs 20, 20 are configured so as to be moved inward in the vehicle width direction when the sub seat cushion 31 is in its arranged position.

Accordingly, since the sub seat cushion 31 is located above the main seat cushion 19 and before the main seat back 20 when it is in its arranged position, the sub seat cushion 31 does not project forward or rearward from the main seats M1 and M2. As a result, the width of the rear seat 18 comprising seat cushion 19 and seat back 20 can be adjusted variably, without improperly affecting spaces behind or before the rear seat 18.

Namely, although the main seats M1 and M2 are independent seats, when the sub seat S (the sub seat cushion 31 and the sub seat back 32) is located between the main seats M1 and M2, the width of the rear seat 18 can be made wider. Meanwhile, when the sub seat S is in its arranged position, the width of the rear seat 18 can be made narrower by moving the main seat backs 20, 20 inward in the vehicle width direction. Thus, both the movement of seats and the improvement of space utility can be attained properly.

Further, the sub seat cushion 31 is configured so as to be located below the sub seat back 32 when the sub seat back 32 and sub seat cushion 31 are in the arranged position respectively.

Accordingly, since the sub seat cushion 31 in the arranged position is located below the sub seat back 32 so as to be hidden as illustrated in FIG. 16, a proper appearance can be provided and the sub seat cushion 31 will not be an obstacle to any things.

Additionally, the sub seat back 32 is configured so as to be used as the armrest when the sub seat back 32 is in its arranged position.

Accordingly, since the sub seat back 32 in the arranged position is used as the armrest, the comfortable sitting can be provided to the passengers on the rear seat.

Further, the main seats M1, M2 are configured so as to be moved back obliquely so as to approach each other.

Accordingly, since slide rails for the lateral movement or the longitudinal movement are not necessary, the main seats M1 and M2 can be moved backward with a simple structure.

Additionally, the seat device further comprises the seat slide rail 24 extending straightly, by which the main seats M1 and M2 are moved back obliquely.

Accordingly, the main seats M1 and M2 can be moved back obliquely with the simple structure of the seat slide rail 24.

Also, there is provided a pair of wheel houses 22, 22 projecting inward in the cabin 2 behind the main seats M1 and M2, and the main seats M1 and M2 are configured so as to be in the position between said wheel houses 22, 22.

Accordingly, since the main seats M1 and M2 are moved so as to be in the position between said wheel houses 22, 22 projecting inward in the cabin 2, the improvement of comfortable sitting of the passengers on the main seats M1 and M2 can be attained.

Also, the sub seat back 32 is supported on either one of the main seats M1 and M2, and the main seats M1 and M2 are configured so as to be moved forward so that the specified space 70 can be formed between the main seats M1 and M2 as illustrated in FIG. 26.

Accordingly, this space 70 which is formed between the main seats M1 and M2 moved forward can provide some cargo space for relatively long things.

Further, the sub seat back 32 and sub seat cushion 31 are configured so as to be moved respectively to the arranged position thereof (see FIGS. 14 through 17), being separated from the main seat back 20 and main seat cushion 19 respectively, and there is provided the sub-seat operational linkage 50 which is configured so as to move the sub seat cushion 31 to the arranged position, linking with the movement of the sub seat back 32 to the arranged position.

Accordingly, since the sub-seat operational linkage 50 moves the sub seat cushion 31 to the arranged position, linking with the movement of the sub seat back 32 to the arranged position, it will not be necessary that the sub seat back 32 and the sub seat cushion 31 are operated separately to be moved to the arranged position. Thus, the operability can be improved. Also, since the sub seat back 32 and sub seat cushion 31 are separated from the main seat back 20 and main seat cushion 19 respectively in the arranged position, the width of the rear seat 18 can be adjustable so as to be narrower after the sub seat back 32 and sub seat cushion 31 have been moved to the arranged position.

Also, the sub-seat operational linkage 50 is configured so as to return the sub seat cushion 31 to the returned position (the normal position illustrated in FIGS. 3 through 6) where the sub seat cushion 31 is adjacent to the main seat cushion 19, linking with the return of the sub seat back 32 to the returned position where sub seat back 32 is adjacent to the main seat back 20.

Accordingly, since the sub-seat operational linkage 50 operate the both 31 and 32 together in the both movement directions between the returned position (normal position) and the arranged position, the operability can be improved further.

Additionally, the sub seat cushion 31 is configured so as to be in the arranged position in which the sub seat cushion 31 is located above the main seat cushion 19 and before the main seat back 20.

Accordingly, since the sub seat cushion 31 is located above the main seat cushion 19 and before the main seat back 20 when it is in its arranged position, the sub seat cushion 31 does not project forward or rearward from the main seats M1 and M2. As a result, the width of the rear seat 18 can be adjusted variably, without improperly affecting spaces behind or before the rear seat 18.

Namely, although the main seats M1 and M2 are independent seats, in the state where the sub seat S (the sub seat cushion 31 and the sub seat back 32) is located between the main seats M1 and M2, the width of the rear seat 18 can be made wider. Meanwhile, when the sub seat S is in its arranged position, the width of the rear seat 18 can be made narrower by moving the main seats M1 and M2 inward in the vehicle width direction. Thus, both the movement of the rear seat 18 and the improvement of space utility can be attained properly.

Also, the sub seat cushion 32 is configured so as to be located below the sub seat back 32 and the sub seat back 32 is configured so as to be available for the armrest when the sub seat back 32 and sub seat cushion 31 are in the arranged position respectively.

Accordingly, since the sub seat cushion 31 is located below the sub seat back 32 when the sub seat back 32 and the sub seat cushion 31 have been operated together by the sub-seat operational linkage 50 and moved to the arranged position, the proper appearance can be provided. Further, since the sub seat back 32 in the arranged position will be used as the armrest, the improvement of comfortable sitting of passengers can be attained.

Further, the main seat backs 20, 20 and main seat cushions 19, 19 are configured so as to be moved inward in the vehicle width direction and approach each other when the sub seat back 32 and sub seat cushion 31 are in the arranged position.

Accordingly, the main seat backs 20, 20 and main seat cushions 19, 19 can be adjustable in the vehicle width direction when the sub seat S is in the arranged position.

Although the above-described embodiment discloses the seat device which is applied to the second-row seat of the vehicle in which plural-row seats (two-row seats) of the front seat 14 and the rear seat 18 are provided longitudinally, the seat device according to the present invention may be applied to a rear-row seat, which is located adjacent to the wheel houses, for the vehicle including three-row or four-row seats.

The present invention should not limited to the above-described embodiment, but any other modifications and improvements may be applied within the scope of a sprit of the present invention.

What is claimed is:

1. A seat device for a vehicle, comprising:
  a pair of main seats disposed in a vehicle width direction, each of the main seats including a main seat cushion and a main seat back;
  a sub seat disposed between said main seats, the sub seat comprising a sub seat back disposed between said main seat backs and a sub seat cushion provided between said main seat cushions,
  wherein said sub seat back and said sub seat cushion are configured so as to be in an arranged position thereof in which at least a part of the sub seat back and at least a part of the sub seat cushion are located over said main seat cushion, the sub seat back and the sub seat cushion are located before said main seat back, and said main seat backs and said main seat cushions are configured so as to be moved inward in the vehicle width direction when said sub seat back and the sub seat cushion are in said arranged position.

2. The seat device for a vehicle of claim 1, wherein said sub seat cushion is configured so as to be located below said sub seat back when said sub seat back and sub seat cushion are in said arranged position respectively.

3. The seat device for a vehicle of claim 1, wherein said sub seat back is configured so as to be used as an armrest when said sub seat back is in said arranged position.

4. The seat device for a vehicle of claim 1, wherein said main seats are configured so as to be moved back obliquely so as to approach each other.

5. The seat device for a vehicle of claim 4, further comprising a seat slide rail, by which said main seats are moved back obliquely.

6. The seat device for a vehicle of claim 1, wherein there is provided a pair of wheel houses projecting inward in a cabin behind said main seats, and said main seats are configured so as to be in a position between said wheel houses.

7. The seat device for a vehicle of claim 1, wherein said sub seat back is supported on either one of said main seats, and said main seats are configured so as to be moved forward so that a specified space can be formed between said main seats.

8. The seat device for a vehicle of claim 1, there is provided a sub-seat operational linkage which is configured so as to move said sub seat cushion to the arranged position, linking with a movement of said sub seat back to the arranged position.

9. The seat device for a vehicle of claim 8, wherein said sub-seat operational linkage is configured so as to return said sub seat cushion to a returned position where said sub seat cushion is adjacent to said main seat cushion, linking with a return of said sub seat back to a returned position where said sub seat back is adjacent to said main seat back.

10. The seat device for a vehicle of claim 8, wherein said sub seat cushion is configured so as to be in said arranged position in which the sub seat cushion is located above said main seat cushion and before said main seat back.

11. The seat device for a vehicle of claim 10, wherein said sub seat cushion is configured so as to be located below said sub seat back and said sub seat back is configured so as to be available for an armrest when said sub seat back and sub seat cushion are in said arranged position respectively.

12. The seat device for a vehicle of claim 8, wherein said main seat backs and main seat cushions are configured so as to be moved inward in the vehicle width direction and approach each other when said sub seat back and sub seat cushion are in said arranged position.

13. The seat device for a vehicle of claim 8, wherein said main seats are configured so as to be moved back obliquely and approach each other.

14. The seat device for a vehicle of claim 8, wherein there is provided a pair of wheel houses projecting inward in a cabin behind said main seats, and said main seats are configured so as to be in a position between said wheel houses.

* * * * *